United States Patent
Abumiya et al.

(10) Patent No.: US 8,092,764 B2
(45) Date of Patent: Jan. 10, 2012

(54) METHOD OF PROCESSING NON-FERROUS SMELTING INTERMEDIATE CONTAINING ARSENIC

(75) Inventors: Mitsuo Abumiya, Tokyo (JP); Yusuke Sato, Akita (JP); Hironobu Mikami, Akita (JP); Masami Oouchi, Tokyo (JP); Tetsuo Fujita, Tokyo (JP); Masayoshi Matsumoto, Tokyo (JP)

(73) Assignee: Dowa Metals and Mining Co., Ltd., Tokyo (JP)

( * ) Notice: Subject to any disclaimer, the term of this patent is extended or adjusted under 35 U.S.C. 154(b) by 0 days.

(21) Appl. No.: 12/452,534

(22) PCT Filed: Jul. 11, 2008

(86) PCT No.: PCT/JP2008/062611
§ 371 (c)(1),
(2), (4) Date: Mar. 24, 2010

(87) PCT Pub. No.: WO2009/011317
PCT Pub. Date: Jan. 22, 2009

(65) Prior Publication Data
US 2010/0196230 A1    Aug. 5, 2010

(30) Foreign Application Priority Data

Jul. 13, 2007  (JP) ................. 2007-185051
Mar. 10, 2008  (JP) ................. 2008-059366

(51) Int. Cl.
*C01G 28/00* (2006.01)
(52) U.S. Cl. .......... 423/87; 423/617; 423/602; 423/601; 423/47
(58) Field of Classification Search .................. 423/87, 423/617, 601, 602, 47
See application file for complete search history.

(56) References Cited

U.S. PATENT DOCUMENTS

| | | | |
|---|---|---|---|
| 4,244,927 A | 1/1981 | Reynolds et al. |
| 4,572,822 A | 2/1986 | Abe et al. |
| 5,126,116 A | 6/1992 | Krause et al. |
| 5,135,223 A | 8/1992 | You |
| 5,449,503 A | 9/1995 | Redmon et al. |
| 2003/0192404 A1 | 10/2003 | Jones |

FOREIGN PATENT DOCUMENTS

| | | |
|---|---|---|
| JP | A-58-24378 | 2/1983 |
| JP | A-58-141346 | 8/1983 |
| JP | A-61-24329 | 2/1986 |

(Continued)

OTHER PUBLICATIONS

Supplementary European Search Report issued in Application No. 08 79 1091; Dated Oct. 12, 2010.

(Continued)

*Primary Examiner* — Melvin Mayes
*Assistant Examiner* — Melissa Stalder
(74) *Attorney, Agent, or Firm* — Oliff & Berridge, PLC

(57) ABSTRACT

Provided is a method of easily producing easily-filterable and stable scorodite that meets the leaching standard (conformance to Japanese Environmental Agency Notice 13) with excellent reproducibility and without using complex operations, when processing arsenic that is included in non-ferrous smelting intermediates, and particularly when processing arsenic in the form of a sulfide. Scorodite is produced by a leaching step of leaching arsenic from a non-ferrous melting intermediate containing arsenic in the weakly acid region, a solution adjusting step of oxidizing trivalent arsenic to pentavalent arsenic by adding an oxidizing agent to the leaching solution, and a crystallizing step of converting the arsenic in the adjusted solution to scorodite crystals.

8 Claims, 5 Drawing Sheets

FOREIGN PATENT DOCUMENTS

| JP | B2-61-24329 | 6/1986 |
|---|---|---|
| JP | A-62-182252 | 8/1987 |
| JP | A-4-238816 | 8/1992 |
| JP | A-6-25763 | 2/1994 |
| JP | A-9-110428 | 4/1997 |
| JP | A-9-241776 | 9/1997 |
| JP | A-9-315819 | 12/1997 |
| JP | A-11-47764 | 2/1999 |
| JP | A-2000-219920 | 8/2000 |
| JP | A-2003-137552 | 5/2003 |
| JP | A-2004-307965 | 11/2004 |
| JP | A-2005-161123 | 6/2005 |
| JP | A-2006-116468 | 5/2006 |
| JP | A-2006-198448 | 8/2006 |
| JP | A-2006-328498 | 12/2006 |

OTHER PUBLICATIONS

International Search Report issued in International Application No. PCT/JP2008/062610 on Oct. 14, 2008 (with English-language translation).

International Search Report issued in International Application No. PCT/JP2008/062615 on Aug. 19, 2008 (with English-language translation).

International Search Report issued in International Application No. PCT/JP2008/062619 on Aug. 19, 2008 (with English-language translation).

International Search Report issued in International Application No. PCT/JP2008/062617 on Oct. 21, 2008 (with English-language translation).

Written Opinion of the International Searching Authority issued on Feb. 9, 2010 in corresponding International Application No. PCT/JP2008/062610.

Written Opinion of the International Searching Authority issued on Feb. 9, 2010 in corresponding International Application No. PCT/JP2008/062611.

Written Opinion of the International Searching Authority issued on Feb. 9, 2010 in corresponding International Application No. PCT/JP2008/062615.

Written Opinion of the International Searching Authority issued on Feb. 24, 2010 in corresponding International Application No. PCT/JP2008/062617.

Written Opinion of the International Searching Authority issued on Feb. 9, 2010 in corresponding International Application No. PCT/JP2008/062619.

U.S. Appl. No. 12/452,509, filed Mar. 18, 2010 in the name of Mitsuo Abumiya et al.

U.S. Appl. No. 12/452,534, filed Mar. 24, 2010 in the name of Mitsuo Abumiya et al.

U.S. Appl. No. 12/452,593, filed Jan. 11, 2010 in the name of Mitsuo Abumiya at al.

U.S. Appl. No. 12/452,586, filed Mar. 29, 2010 in the name of Mitsuo Abumiya et al.

U.S. Appl. No. 12/452,686, filed Apr. 15, 2010 in the name of Mitsuo Abumiya.

Nishimura et al.; "On the Solubility Products of Ferric, Calcium and Magnesium Arsenates;" *Bulletin of the Research Institute of Mineral Dressing and Metallurgy*; Jun. 1978; pp. 20-26; vol. 34, No. 1; Tohoku University; Sendai, Japan (with Abstract).

Krause et al.; "Solubilities and Stabilities of Ferric Arsenate Compounds;" *Hydrometallurgy*; 1989; pp. 311-337; vol. 22; Elsevier Science Publishers B.V.; Amsterdam, The Netherlands.

Filippou et al.; "Arsenic Immobilization by Controlled Scorodite Precipitation;" *JOM*; Dec. 1997; pp. 52-55; vol. 49, No. 12.

International Search Report mailed on Oct. 14, 2008 in corresponding International Application No. PCT/JP2008/062611.

May 26, 2011 Office Action issued in U.S. Appl. No. 12/452,586.

May 31, 2011 Office Action issued in U.S. Appl. No. 12/452,686.

May 31, 2011 Office Action issued in U.S. Appl. No. 12/452,593.

May 27, 2011 Office Action issued in U.S. Appl. No. 12/452,509.

Weert et al., "Aqueous Processing of Arsenic Trioxide to Crystalline Scorodite," *JOM*, Jun. 1994, pp. 36-38, vol. 46, No. 6. Published by Springer New York LLC, USA.

Droppert et al., "Ambient Pressure Production of Crystalline Scorodite From Arsenic-Rich Metallurgical Effluent Solutions," *EPD Congress*, Feb. 4, 1996, pp. 227-239, published by The Minerals, Metals &Materials Society, Warrendale, Pa, USA.

Extended European Search Report issued in European Application No. 08791096.4 on Jul. 22, 2010.

Extended European Search Report issued in European Application No. 08791100.4 on Aug. 27, 2010.

Extended European Search Report issued in European Application No. 08791098.0 on Jul. 27, 2010.

Extended European Search Report issued in European Application No. 08791092.3 on Jun. 28, 2010.

Sep. 20, 2011 Notice of Allowance issued in U.S. Appl. No. 12/452,593.

Sep. 21, 2011 Notice of Allowance issued in U.S. Appl. No. 12/452,686.

Sep. 19, 2011 Office Action issued in U.S. Appl. No. 12/452,586.

METHOD OF PROCESSING NON-FERROUS SMELTING INTERMEDIATE CONTAINING ARSENIC

TECHNICAL FIELD

The present invention relates to an arsenic processing method of extracting arsenic from smelting intermediates that contain arsenic, and converting the arsenic to scorodite crystals, being a stable arsenic compound.

BACKGROUND ART

The following documents concerning the stability of compounds which contain arsenic are available. Patent document 1 presents a method of producing scorodite from arsenic contained in smelting smoke and ash.

Patent document 2 presents a method of leaching arsenic sulfide where air is blown into a slurry containing arsenic sulfide while adding an alkali, in order to leach out arsenic while maintaining the pH between 5 and 8.

Non-patent document 1 reports on the solubility product of iron arsenate, calcium arsenate, and magnesium arsenate. According to this document, calcium arsenate and magnesium arsenate are stable only in the alkali region, but iron arsenate is stable from the neutral to acidic region, and the minimal solubility at a pH of 3.2 was reported to be 20 mg/l.

Non-patent document 2 discloses the solubility of iron arsenate and scorodite. This document shows that the solubility of arsenic from scorodite in the weakly acidic region is two orders of magnitude smaller than that of noncrystalline iron arsenate, and discloses that scorodite is a stable arsenic compound.

Non-patent document 3 presents a method of producing scorodite from arsenic contained in sulfuric acid plant waste water and smelter waste water.

Patent document 1: Japanese Patent Application Laid-open No. 2005-161123
Patent document 2: Japanese Patent Publication No. S61-24329
Non-patent document 1: Tadahisa Nishimura and Kazumitsu Tozawa, Res. Inst. of Mineral Dressing and Metallurgy, Tohoku University, No. 764, Vol. 34, Edition 1, Reprint June 1978.
Non-patent document 2: E. Krause and V. A. Ettel, "Solubilities and Stabilities of Ferric Arsenate Compounds" Hydrometallurgy, 22, 311-337, (1989)
Non-patent document 3: Dimitrios Filippou and George P. Demopoulos, "Arsenic Immobilization by Controlled Scorodite Precipitation" JOM Dec., 52-55, (1997)

DISCLOSURE OF THE INVENTION

Problems that the Invention is to Solve

In recent years, the global environment for securing raw material ore for use in non-ferrous smelting has become extremely difficult. In the field of copper smelting in particular, the supply is extremely tight because oligopolization by the major non-ferrous manufacturers is progressing, and new major consuming countries such as developing country are appearing. Under these conditions, environmental regulations with regards to pollution are becoming stricter and more obligatory in all countries. The present inventors believe that mines and smelters that can coexist with the environment will lead this industry in the future.

Herein, the pollution that is a concern for non-ferrous smelting includes air pollution due to $SO_2$ gas, as well as soil and waste water pollution by arsenic. With regards to arsenic in particular, the amount of arsenic included in copper ore will increase in the future, so an infallible countermeasure is necessary more than ever. Conventionally, coastal non-ferrous smelters in Japan have been operating without problem by using clean concentrate ore as a processing raw material. However, the amount of arsenic in copper ore is expected to increase in the future. Therefore, extracting arsenic from the system as smelting intermediates and stabilizing and storing arsenic in some form will be necessary.

Overseas, there are many smelters which store arsenic as calcium arsenate, diarsenic trioxide, or arsenic sulfide compounds. However, based on observations by the present inventors, these arsenic compounds are not perfectly stable in a natural environment.

Therefore, the present inventors researched the aforementioned documents. However, all of these methods have various problems with regards to the productivity, the stability of the scorodite that is produced, and the like.

In light of the foregoing, an object of the present invention is to resolve these problems, and provide a method of producing easily-filterable and stable scorodite that meets the leaching standard (conformance to Japanese Environmental Agency Notice 13) easily with good reproducibility and without complicated operations, in processing of arsenic contained in non-ferrous smelting intermediates and especially in processing of arsenic in the form of a sulfide.

The present inventors have conducted diligent research in order to resolve the aforementioned problems. As a result, the present inventors have made completely new discovery that arsenic can be recovered as easily-filterable and stable scorodite from initial non-ferrous smelting intermediates, by performing three steps that are: a step (leaching step) of extracting arsenic by leaching from non-ferrous smelting intermediates; a step (solution adjusting step) of oxidizing the trivalent arsenic in the leaching solution to a pentavalent form using an oxidizing agent, and then removing the residual oxidizing agent; and a step (crystallizing step) of adding and dissolving ferrous ($Fe^{2+}$) salt in the adjusted solution in order to perform oxidation in an acidic state and thus produce scorodite crystals, and further performing the leaching step of extracting arsenic by leaching from non-ferrous smelting intermediates by performing a first step of leaching arsenic while maintaining the pH in a range of 4.0 to 6.5 and a second step of, without maintaining the pH, leaching arsenic while allowing the pH to change.

In addition, the present inventors discovered that an oxidation reaction of oxidizing trivalent arsenic to pentavalent arsenic in a short period of time can be performed by blowing an oxidized gas into an aqueous solution containing the trivalent arsenic while heating the aqueous solution containing the trivalent arsenic in the presence of the three types of substances that are copper sulfide, copper ions, and copper pentavalent arsenic compounds as catalysts. Moreover, the present inventors confirmed that 99% or more of the trivalent arsenic is oxidized to a pentavalent form at the stop of this oxidation reaction, and have thus achieved the present invention.

In other words, the first means for resolving the aforementioned problems is an arsenic processing method, comprising: a first step of leaching arsenic from a non-ferrous smelting intermediate containing arsenic, while maintaining a pH in a range of 4.0 to 6.5; a second step of leaching arsenic while allowing the pH to change, without maintaining the pH; a third step of oxidizing trivalent arsenic to pentavalent arsenic, by adding an oxidation agent to a leaching solution; and a fourth step of converting arsenic in an adjusted solution to scorodite crystals.

The second means is the arsenic processing method according to the first means, wherein the arsenic contained in the non-ferrous smelting intermediate is in a sulfide form or in a mixture of a sulfide form and an oxide form.

The third means is the arsenic processing method according to the first means or the second means, wherein the first step comprises forming a slurry from the non-ferrous smelting intermediate, and performing leaching while maintaining the pH in the range of 4.0 to 6.5 by adding sodium hydroxide at a temperature of 50° C. or higher, while blowing air, oxygen gas, or a gas mixture of air and oxygen gas, and the second step comprises stopping the maintenance of the pH at a point when the arsenic contained in the non-ferrous smelting intermediate is leached in a range of 50% to 90%, continuing leaching while keeping the blowing of air, oxygen gas, or a gas mixture of air and oxygen gas, and completing a reaction at a point when the pH decreases to below 4.

The fourth means is the arsenic processing method according to the first means or the second means, wherein the first step comprises forming a slurry from the non-ferrous smelting intermediate, and performing leaching while maintaining the pH in the range of 4.0 to 6.5 by adding sodium hydroxide at a temperature of 50° C. or higher, while blowing air, oxygen gas, or a gas mixture of air and oxygen gas, and the second step comprises stopping the maintenance of the pH at a point when the arsenic contained in the non-ferrous smelting intermediate is leached in a range of 50% to 90%, continuing leaching while keeping the blowing of air, oxygen gas, or a gas mixture of air and oxygen gas, stopping the blowing at a point when the pH decreases to below 4, and further performing mixing for 10 minutes or longer before completion.

The fifth means is the arsenic processing method according to any of the first to fourth means, wherein the third step comprises a liquid adjusting step of adding hydrogen peroxide to the leaching solution at a temperature of 40° C. or higher to oxidize the trivalent arsenic to the pentavalent arsenic, and then bringing the reacted solution into contact with metallic copper to remove residual hydrogen peroxide.

The sixth means is the arsenic processing method according to any of the first to fifth means, wherein the fourth step comprises a crystallizing step of adding and dissolving ferrous ($Fe^{2+}$) salt into the adjusted solution, and causing an oxidation reaction.

The seventh means is the arsenic processing method according to any of the first to sixth means, wherein the oxidation is performed in a pH range of 1 or lower.

The eighth means is the arsenic processing method according to any of the first to seventh means, wherein the oxidation reaction is performed at a temperature of 50° C. or higher.

The ninth means is the arsenic processing method according to any of the first to eighth means, wherein the oxidation reaction is blowing of air, oxygen gas, or a gas mixture of air and oxygen gas.

The tenth means is an arsenic oxidation method, wherein at least one of air and/or oxygen gas is blown into a solution to oxidize trivalent arsenic in the solution to pentavalent arsenic, the solution containing at least one of diarsenic trioxide ($As_2O_3$) and/or arsenous acid ions, being heated to 50° C. or higher, having a pH of not less than 1 in a neutral region, and comprising copper sulfide, copper ions, and a copper pentavalent arsenic compound.

The eleventh means is an arsenic oxidation method, wherein by blowing at least one of air and/or oxygen gas into a solution that contains at least one of diarsenic trioxide ($As_2O_3$) and/or arsenous acid ions, is heated to 50° C. or higher, has a pH of not less than 2 in a neutral region, and comprises copper sulfide, trivalent arsenic in the solution is oxidized to pentavalent arsenic, while generating the copper pentavalent arsenic compound by dissolving a portion of the copper sulfide.

The twelfth means is the arsenic oxidation method according to the tenth or eleventh means, wherein the pH is not less than 2 when the blowing of at least one of air and/or oxygen gas starts, and less than 2 when the blowing of at least one of air and/or oxygen gas ends.

The thirteenth means is the arsenic oxidation method according to any of the tenth to twelfth means, wherein after the trivalent arsenic in the solution is oxidized to the pentavalent arsenic, the solution produced by pulp is filtered and a filtering residue is recovered, and the filtering residue is used as a substitute for the copper sulfide.

The fourteenth means is the arsenic oxidation method according to any of the tenth to thirteenth means, wherein after the trivalent arsenic in the solution is oxidized to the pentavalent arsenic, the solution produced by pulp is neutralized to bring the pH to not less than 3 and thereby crystallize the copper ions in the solution as the copper pentavalent arsenic compound, and then filtering is performed to recover a filtrate and a filtering residue, and the filtering residue is used as a substitute for the copper sulfide.

Effects of the Invention

According to any of the first to ninth means, easily-filterable and stable scorodite crystals can be easily produced with good reproducibility and without complicated operations. Furthermore, the scorodite crystals produced can meet the leaching standard (conformance to Japanese Environmental Agency Notice 13).

Moreover, according to any of the tenth to fourteenth means, trivalent arsenic can be oxidized to pentavalent arsenic at an oxidation rate of 99% or more with low operation costs and low equipment costs, by using materials that are easily obtainable in non-ferrous smelters. Furthermore, according to the present invention, the pH of the solution at the stop of the oxidation reaction is not less than 1 and below 2, which is favorable for producing scorodite ($FeAsO_4 \cdot 2H_2O$). In this respect, too, the present invention contributes to low operation costs and low equipment costs.

BEST FORM FOR CARRYING OUT THE INVENTION

As described above, the present invention relates to an arsenic processing method comprising: a leaching step of leaching arsenic from non-ferrous smelting intermediates containing arsenic in the weakly acidic region; a solution adjusting step of oxidizing the trivalent arsenic in the leaching solution to a pentavalent form by adding an oxidizing agent to the leaching solution; and a crystallizing step of converting the arsenic in the adjusted solution to scorodite crystals.

The present invention also relates to a method of oxidizing trivalent arsenic to pentavalent arsenic at an oxidation rate of 99% or more with low operation costs and low equipment costs.

Hereinafter, with regard to a first embodiment, the 1. Non-ferrous smelting intermediates containing arsenic; 2. Leaching step; 3. Solution adjusting step; 4. Crystallizing step of converting arsenic in the adjusted solution to scorodite crystals; and Examples 1 to 3 and Comparative Example 1 will be described in order in detail while referring to the flowchart shown in FIG. 1.

Next, with regard to the method of oxidizing trivalent arsenic to pentavalent arsenic at an oxidation rate of 99% or more with low operation costs and low equipment costs as a second embodiment, the 1. Processing object; 2. Oxidation reaction of trivalent arsenic; 3. pH of the trivalent arsenic at the beginning of the oxidation reaction; 4. pH of the trivalent arsenic at the stop of the oxidation reaction; and Examples 4 to 8 and Comparative Examples 2 to 6 will be described in order in detail while referring to the flowchart shown in FIG. 3, and further the 5. Trivalent arsenic oxidation reaction model conceived by the present inventors will be described.

FIRST EMBODIMENT

1. Non-Ferrous Smelting Intermediates Containing Arsenic

The non-ferrous smelting intermediates containing arsenic (1) according to the present invention refers to the residue recovered by causing smelting step water or waste water containing arsenic to react with a sulfidizing agent such as hydrogen sulfide, sodium hydrogen sulfide, or sodium sulfide, and is wherein the arsenic is in the form of a sulfide. Hereinafter, this residue may be simply called "sulfide residue".

2. Leaching Step

The leaching step according to the present invention includes a first step (2) of leaching arsenic while controlling the pH of the leaching solution within the weakly acidic region (the step may be called "early leaching step" in this specification for the same of convenience), and a second step (3) of leaching arsenic while the pH changes without the pH control of the leaching solution (the step may be called "latter leaching step" in this specification for the sake of convenience). The early leaching step (2) and the latter leaching step (3) will be described below.

(a) First Step (Early Leaching Step)

First, the sulfide residue containing arsenic explained in the above "1. Non-ferrous smelting intermediates containing arsenic" is subject to repulp with water into the pulp form, and the pulp residue is heated to a temperature of 50° C. or more, and preferably 80° C. or more. While blowing air, oxygen gas, or a gas mixture of air and oxygen gas, sodium hydroxide (NaOH) is added and leaching is performed while maintaining the pH in a range of 4.0 to 6.5.

By performing leaching while maintaining the pH in the range of 4.0 to 6.5, arsenic can be efficiently leached while limiting the amount of sodium hydroxide added.

This can be attributed to the following.

In the early leaching step (2), arsenic is leached while NaOH is consumed, according to the following reactions of (Equation 1) and (Equation 2).

$$As_2S_3 + 3/2 O_2 + H_2O = 2HAsO_2 + 3S \quad \text{(Equation 1)}$$

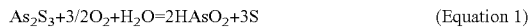

$$HAsO_2 + 1/2 O_2 + NaOH = NaH_2AsO_4 \quad \text{(Equation 2)}$$

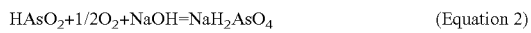

As a result of research, the present inventors have discovered that the consumed amount of NaOH sharply increases when the pH is increased to more than 6.5 in this stage. This is probably because the increase of the pH causes the reaction of the following (Equation 3) to proceed instead of the reaction of the above (Equation 2).

$$HAsO_2 + 1/2 O_2 + 2NaOH = Na_2HAsO_4 \quad \text{(Equation 3)}$$

According to the above reasoning, the consumed amount of NaOH in the reaction of (Equation 3) is twice the consumed amount of NaOH in the reaction of (Equation 2). Therefore, it is conceived that the reaction pH is no more than 6.5, and optimally 6.0, in order to reduce the consumed amount of NaOH.

On the other hand, when the sulfide residue is stored in atmospheric conditions for a long time, the sulfide residue itself is oxidized, and part of arsenic sulfide is decomposed into diarsenic trioxide ($As_2S_3$) and sulfuric acid. Accordingly, when the sulfide residue is subject to repulp with water, the above diarsenic trioxide is eluted as arsenous acid ($HAsO_2$) and becomes sulfite acidic pulp. In this case, the added NaOH is consumed in the early leaching step as shown in (Equation 4) and (Equation 5), which hinders the increase of the pH.

$$H_2SO_4 + 2NaOH = Na_2SO_4 + 2H_2O \quad \text{(Equation 4)}$$

$$HAsO_2 + NaOH = NaAsO_2 + H_2O \quad \text{(Equation 5)}$$

When this occurs, the pH is increased not to 6 but to at least 4 in consideration of the consumed amount of NaOH, and subsequently the same operation can be performed. In such a case, though the efficiency of oxidizing trivalent arsenic to pentavalent arsenic slightly decreases, the operation can still be performed sufficiently. Note, though it is not impossible to perform the same operation even when the pH is below 4, the oxidation efficiency from trivalent arsenic to pentavalent arsenic further decreases and the proportion of trivalent arsenic increases, so that crystals tend to appear when the solution temperature decreases. Therefore, temperature control needs to be performed carefully.

For the above reason, the pH in the early leaching step is preferably 4.0 or more.

(b) Second Step (Latter Leaching Step)

The above leaching while maintaining the pH in the range of 4.0 to 6.5 is an excellent leaching method that can efficiently leach arsenic while limiting the amount of sodium hydroxide added. However, as a result of further research, the present inventors have found that this method has the following problem.

Which is to say, in the latter half stage of the leaching where at least 50% and even near 90% of arsenic sulfide contained in the sulfide residue is leached, heavy metals (such as lead, zinc, and the like) contained in the residue together with arsenic sulfide are eluted. These eluted heavy metals react with pentavalent arsenic in the leaching solution in this pH region to form an arsenate compound which then precipitate. This causes the leaching rate to decrease.

In addition, it has been found that the consumed amount of NaOH increases in the latter half stage of the leaching. This increase of the NaOH consumed amount is thought to be caused by monatomic sulfur in the leaching pulp undergoing sulfuric acid formation reaction shown in the following (Equation 6) and dissolving as $H_2SO_4$.

$$S + 3/2 O_2 + H_2O = H_2SO_4 \quad \text{(Equation 6)}$$

It has also been found that, in the latter half stage of the leaching, part of monatomic sulfur takes a form (unknown) other than $SO_4^{2-}$ (sulfate radical) and dissolves, as a result of which the oxidation efficiency in the next solution adjusting step decreases. Furthermore, the present inventors have learned that, when the sulfur compound remains until the last crystallizing step, microscopic and unstable scorodite (7) with significantly lower filterability is produced in the crystallizing step (6), which significantly hinders operations.

From the above analysis, the present inventors have conceived a structure in which the early leaching step (2) that maintains the pH in the range of 4.0 to 6.5 is performed only when the arsenic leaching rate is in a range of 50% to 90% and subsequently the latter leaching step (3) that does not maintain the pH adjustment using NaOH is performed. That is, in the latter leaching step (3), the pH adjustment by an agent such as NaOH is not performed, so that the pH follows the progress of the reaction. More specifically, the addition of NaOH is stopped.

In the latter leaching step (3), when the pH adjustment using NaOH is not maintained, the pH of the leaching solution (6) drops below 4 as the leaching progresses. It is thought that the pH drops below 4 according to the following (Equation 7) and (Equation 8).

$$As_2S_3 + 3/2 O_2 + H_2O = 2HAsO_2 + 3S \quad \text{(Equation 7)}$$

$$HAsO_2 + 1/2 O_2 + H_2O = H_2AsO_4^- + H^+ \quad \text{(Equation 8)}$$

Note, an approximate arsenic leaching rate that is used as a parameter for switching from the early leaching step (2) to the latter leaching step (3) can be easily estimated by the consumed amount of NaOH based on the above (Equation 2).

As a result of allowing the pH of the leaching solution (4) to be below 4 in the latter leaching step (3), the lead concentration in the leaching solution (4) can be reduced to about one order of magnitude lower than when the leaching is completed with the pH in the range of 5 to 8. In particular, when ferrous sulfate is used as ferrous salt in the subsequent crystallizing step (6), the lead in the leaching solution (4) forms $PbSO_4$ (lead sulfate) and contaminates the scorodite (7), as a result of which the amount of lead eluted exceeds environmental standards. In this respect, too, the present invention provides significant effects.

Moreover, when the pH of the leaching solution (4) is more acidic, monatomic sulfur is more stable and is less soluble, which is preferable. The present inventors have found a phenomenon that is thought to derive from this, in which even when part of monatomic sulfur dissolves in a form (unknown) other than $SO_4^{2-}$ (sulfate radical) due to some reason, this form is completely decomposed if the latter leaching step (3) which is oxidation leaching in the state where the pH is below 4 is continued. The present inventors estimate that a leaching residue (8) has a catalytic role in the decomposition of this form in the region where the pH is below 4.

Furthermore, when the sulfide residue which is the processing object contains a large amount of mercury or contains copper in the readily-soluble form, sulfur contained in the leaching residue (8) can be used as a sulfidizing agent, which is preferable.

Specifically, mercury or copper which dissolves into the leaching solution (4) from the sulfide residue is removed and put into the leaching residue (8) according to the following (Equation 9) and (Equation 10), and introduced in a copper smelting step (9). That is, S contained in the leaching residue (8) can be utilized as a sulfidizing agent.

$$Hg^{2+} + 4/3 S + 4/3 H_2O = HgS + 1/3 SO_4^{2-} + 8/3 H^+ \quad \text{(Equation 9)}$$

$$Cu^{2+} + 4/3 S + 4/3 H_2O = CuS + 1/3 SO_4^{2-} + 8/3 H^+ \quad \text{(Equation 10)}$$

3. Third Step (Also Referred to as "Solution Adjusting Step" in this Specification for the Sake of Convenience)

The solution adjusting step (5) is a step comprising adding an oxidizing agent to the leaching solution (4) obtained in the aforementioned "2. Leaching step" to oxidize the arsenic dissolved in a trivalent state to pentavalent arsenic, and subsequently removing the oxidizing agent that remains in solution.

First, the oxidizing agent will be described.

Generally, oxidizing trivalent arsenic to pentavalent arsenic is easier in the neutral region than in the acidic region, and even easier in the alkaline region than the neutral region. However, the leaching solution of the present invention is acidic. Therefore, adding an alkali (such as sodium hydroxide) to the acidic leaching solution and oxidizing the arsenic in an alkaline solution could be conceived. However, according to the research of the present inventors, a large amount of an alkali additive is required to make the solution properties alkaline, and in addition to the cost disadvantages, increasing the concentration of salts in the solution is thought to have a negative effect on the production of scorodite (7) in the subsequent step. Note, trivalent arsenic and pentavalent arsenic denote arsenic having a valence of ion of +3 (valence of plus 3) and arsenic having a valence of ion of +5 (valence of plus 5), respectively.

Subsequently, the present inventors investigated oxidizing the arsenic using oxygen gas in a neutral region (pH in a range of 6 to 7). However, the oxidation of arsenic was found to be insufficient. Therefore, use of copper catalyst was examined. This examination result will be explained in a second embodiment as will be described later.

At this point, the present inventors considered the use of hydrogen peroxide ($H_2O_2$) as an oxidizing agent. When hydrogen peroxide was used during the investigation to oxidize the arsenic under acidic conditions, sufficient oxidation was confirmed. For information, the redox potentials (standard hydrogen electrode reference) of oxygen gas, permanganic acid, hydrogen peroxide, and ozone are shown in Table 1.

However, the residual hydrogen peroxide in the solution after the arsenic oxidation reaction would oxidize a portion of the ferrous salt that is added in the subsequent crystallizing step (6), and therefore it is preferable to remove the residual hydrogen peroxide in order to accurately manage the ferrous ion concentration.

The present inventors then evaluated a method of processing the hydrogen peroxide remaining in the solution. First, a metal colloid of gold or silver or the like was added in an attempt to decompose and remove the residual hydrogen peroxide. However, the method of adding a precious metal colloid has high raw material costs, and losses due to handling and the like can be conceived, so implementation was difficult. Therefore, the present inventors came up with a revolutionary concept of bringing the residual hydrogen peroxide into contact with metallic copper in order to remove by consumption rather than by decomposition, and thus succeeded in removing the residual hydrogen peroxide.

TABLE 1

| | Oxidation agent | | | |
| --- | --- | --- | --- | --- |
| | $O_2$ (v) | $MnO_4$ (v) | $H_2O_2$ (v) | $O_3$ (v) |
| Redox potential | 1.23 | 1.51 | 1.78 | 2.07 |

The details will be described below.

First, the hydrogen peroxide that can be used is a standard product with a concentration in a range of 30% to 35%.

Oxidation of trivalent arsenic to pentavalent arsenic under acidic conditions is thought to proceed as shown below in (Equation 11) and (Equation 12).

$$HAsO_2 + H_2O_2 = H_3AsO_4 \quad \text{(Equation 11)}$$

$$HAsO_2 + H_2O_2 = H_2AsO_4^- + H^+ \quad \text{(Equation 12)}$$

The amount of hydrogen peroxide added is preferably in a range of 1 to 1.2 times the reaction equivalent weight based on the concentration of trivalent arsenic and (Equation 11) and (Equation 12). Furthermore, if the concentration of trivalent arsenic is unknown, achieving a redox potential of the solution at 80° C. that is not less than 500 mV (Vs: Ag/AgCl) after adding the hydrogen peroxide provides a good estimate.

The time required for adding the hydrogen peroxide depends on the concentration of trivalent arsenic to be oxidized. For example, if the concentration of trivalent arsenic to be oxidized is 20 g/l, the time required for adding is preferably not less than 5 minutes. Taking sufficient time for adding can help prevent a portion of the hydrogen peroxide from rapidly decomposing, generating a large amount of gas bubbles, and degrading the effect of addition. An addition time of between 10 and 15 minutes is even more preferable.

The oxidation of trivalent arsenic to pentavalent arsenic by the addition of hydrogen peroxide is extremely fast, and an increase in the temperature due to the heat of reaction as well as a reduction in the pH can be observed. However, the reaction time is preferably not less than 60 minutes, from the perspective of achieving complete oxidation, and the reaction is preferably completed once the redox potential of the solution drops to 450 mV (Vs; Ag/AgCl) or less.

One example of measuring the effect of adding hydrogen peroxide will be described here.

First, a solution having an arsenic concentration of 48 g/l was prepared. Note, in this arsenic of 48 g/l, trivalent arsenic was 21 g/l and pentavalent arsenic is 27 g/l.

Hydrogen peroxide was added to this arsenic solution. At this point, an amount of hydrogen peroxide that causes the redox potential at the stop of hydrogen peroxide addition to be 355 mV (80° C.) (Vs; Ag/AgCl) was added to a first sample, and an amount of hydrogen peroxide that causes the redox potential at the stop of hydrogen peroxide addition to be 530 mV (80° C.) (Vs; Ag/AgCl) was added to a second sample. Subsequently, reaction was performed for each of the first and second samples at 80° C. for 90 minutes. As a result of measuring the trivalent arsenic concentration in the solution after the reaction, the trivalent arsenic concentration was 2.4 g/l in the first sample and no more than 0.1 g/l in the second sample.

According to these measurement results, it can be confirmed that achieving a redox potential of the solution at 80° C. that is not less than 500 mV (Vs: Ag/AgCl) provides a good estimate for the amount of hydrogen peroxide added, as described above.

The hydrogen peroxide remaining after the oxidation reaction of the arsenic is removed by bringing into contact with metallic copper. Specifically, a typical method is to add and mix copper powder into the solution in order to cause a reaction. Furthermore, this objective can also be achieved by passing the solution through a column filled with copper plate or copper filings in order to simplify actual plant operations.

The solution temperature is preferably 40° C. or higher in order to complete the reaction.

The removal reaction is thought to proceed as shown below in (Equation 13).

$$Cu^0 + H_2O_2 + H_2SO_4 = CuSO_4 + 2H_2O \quad \text{(Equation 13)}$$

As a result, the removal reaction will proceed in conjunction with an increase in the pH, and can be considered to be complete when the pH reaches a certain value.

In the solution adjusting step (5) of the present invention, trivalent arsenic can be oxidized to pentavalent arsenic without a complex operation even if the leaching solution (4) is in the acidic zone, and therefore the high efficiency of converting arsenic to scorodite (7) in the subsequent step can be maintained.

4. Fourth Step (Also Referred to as "Crystallizing Step" in this Specification for the Sake of Convenience)

The crystallizing step (6) is a step of crystallizing the pentavalent arsenic in the adjusted solution obtained in the aforementioned "3. Solution adjusting step" to scorodite (7).

The adjusted solution after the aforementioned solution adjusting step (5) is completed is preferably a concentrated solution with an arsenic concentration of 20 g/l or higher, and more preferably 30 g/l or higher, in view of the productivity of scorodite.

First, ferrous salt ($Fe^{2+}$) is added to the adjusted solution and dissolved, and sulfuric acid ($H_2SO_4$) is added at a room temperature to adjust the pH to 1. At this point, various types of ferrous salt compounds are possible, but ferrous sulfate is preferable from the perspective of corrosion resistance of the equipment and because of the ease of procurement.

The amount of ferrous salt, calculated as pure Fe, added is equal to or greater than one times and preferably 1.5 times the number of moles of arsenic to be treated.

After adding the ferrous salt and adjusting the pH, the adjusted solution is heated to a prescribed reaction temperature. At this time, the scorodite (7) can be deposited if the reaction temperature is at least 50° C. However, a higher reaction temperature is preferable from the perspective of increasing the scorodite particle size. Furthermore, the reaction temperature is preferably between 90 and 100° C., from the perspective of enabling the reaction under atmospheric conditions.

When the adjusted solution reaches a prescribed reaction temperature, blowing of air, oxygen gas, or a gas mixture thereof is started, a gas liquid mixture is created by a vigorous mixing, and a high temperature oxidation reaction proceeds while maintaining a prescribed reaction temperature.

The high temperature oxidation reaction is thought to proceed according to the following (Equation 14) to (Equation 19).

(First Half of the Reaction)

$$2FeSO_4+1/2O_2+H_2SO_4=Fe_2(SO_4)_3+H_2O \quad \text{(Equation 14)}$$

$$2H_3AsO_4+Fe_2(SO_4)_3+4H_2O=2FeAsO_4.2H_2O+3H_2SO_4 \quad \text{(Equation 15)}$$

The complete reaction (Equation 14 and Equation 15) is shown below as (Equation 16).

$$2H_3AsO_4+2FeSO_4+1/2O_2+3H_2O=2FeAsO_4.2H_2O+2H_2SO_4 \quad \text{(Equation 16)}$$

(Second Half of the Reaction after the as Concentration Drops)

$$2FeSO_4+1/2O_2+H_2SO_4=Fe_2(SO_4)_3+H_2O \quad \text{(Equation 17)}$$

$$2/3H_3AsO_4+1/3Fe_2(SO_4)_3+4/3H_2O=2/3FeAsO_4.2H_2O+H_2SO_4 \quad \text{(Equation 18)}$$

The complete reaction (Equation 17 and Equation 18) is shown below as (Equation 19).

$$2/3H_3AsO_4+2FeSO_4+1/2O_2+4/3H_2O=2/3FeAsO_4.2H_2+2/3Fe_2(SO_4)_3 \quad \text{(Equation 19)}$$

Although dependent on the oxidation method, the pH, arsenic concentration, and Fe concentration will drop rapidly between 2 and 3 hours after the start of the high temperature oxidation reaction. At this stage, the redox potential of the solution is 400 mV or higher (Vs; Ag/AgCl) at 95° C. Furthermore, 90% or more of the arsenic that is contained will be in the form of scorodite (7) crystals. After 3 or more hours from the start of the high temperature oxidation reaction, the arsenic remaining in the solution will only decrease by a small amount, and there will be almost no change in the pH and the solution potential. Note, the high temperature oxidation reaction is preferably continued for between 5 and 7 hours in order to reach perfect equilibrium.

Using the aforementioned crystallizing step (6) of the present invention, the reaction operation will be simple, the pH will not need to be adjusted at an intermediate point, and the arsenic that is present can be reliably converted to scorodite (7) crystals. The generated filtrate (10) can be processed in the waste water processing step (11). The scorodite (7) crystals that are obtained have excellent sedimentation and filtering properties, and the adsorbed water content after filtering will only be approximately 10%, while the arsenic grade will be up to 30%, so a reduction in volume can be achieved, and furthermore, the scorodite crystals are stable, with excellent dissolution resistance. Therefore, the arsenic can be removed from the smelting process and stored in a stable form.

EXAMPLES

The present invention will be described below more specifically while presenting examples.

Example 1

1. Non-Ferrous Smelting Intermediates Containing Arsenic 695 wet·g of a sulfide residue generated as non-ferrous smelting intermediates containing arsenic was measured. A composition of the sulfide residue is shown in Table 2.

TABLE 2

| | Element | | | | | | | | | Water |
|---|---|---|---|---|---|---|---|---|---|---|
| | As (%) | S (%) | Cu (%) | Pb (%) | Zn (%) | Sb (%) | Bi (%) | Cd (%) | Hg (ppm) | content (%) |
| Content | 24.54 | 29.91 | 18.87 | 2.60 | 0.41 | 0.78 | 0.69 | 0.09 | 51 | 54 |

2. Leaching Step (a) Early Leaching Step

The sulfide residue measured in the above "1." was placed in a 2 L beaker, and pure water was added to repulp to thereby obtain a volume of 1.6 L.

The sulfide residue in the pulp form was heated while weakly mixing to a temperature of 90° C. Subsequently, a sodium hydroxide solution of a concentration of 500 g/l was added and the pH was adjusted to 6. Next, oxygen gas blowing was started by blowing in oxygen gas at a rate of 800 cc/min using a glass tube from the bottom of the beaker. While vigorously mixing, the addition of the sodium hydroxide solution was continued and leaching was performed with the pH being maintained at 6. The addition amount of the sodium hydroxide solution of the concentration of 500 g/l was 80 cc.

(b) Latter Leaching Step

At the point of 47 minutes after the start of the leaching, the maintenance of the pH was stopped (the addition of the sodium hydroxide solution was stopped). While further continuing the oxygen gas blowing, leaching was performed until 210 minutes after the start of the leaching, and the leaching was complete at this point. As a result of allowing the pH to change according to the reaction after the pH maintenance was stopped, the pH at the stop of the leaching was 2.67 at 90° C. The grade of the obtained leaching solution is shown in Table 3.

TABLE 3

| | Element | | | | | | | |
|---|---|---|---|---|---|---|---|---|
| | As (g/l) | Na (g/l) | S (g/l) | Cu (mg/l) | Pb (mg/l) | Zn (mg/l) | Sb (mg/l) | Bi (mg/l) | Cd (mg/l) |
| Content | 46.9 | 16.1 | 6.8 | <1 | 38 | 463 | 320 | 2 | 59 |

3. Liquid Adjusting Step The trivalent arsenic concentration in the obtained leaching solution was 21 g/l.

900 cc of the leaching solution was placed in a 1 L beaker and heated. 32.9 g of $H_2O_2$ with a 30% concentration was added for 11 minutes starting from the moment the temperature of the leaching solution reached 40° C. The redox potential of the leaching solution when this hydrogen peroxide addition was completed was 552 mV (Vs; Ag/AgCl) at 74° C. Note, the amount of hydrogen peroxide added was 1.15 times the number of equivalents necessary to oxidize the trivalent arsenic.

The heating of the leaching solution was continued to 80° C. Note, the mixing was performed to the degree that air did not get mixed in. The changes in solution temperature, pH, and redox potential in the reaction are shown in Table 4.

The reaction was completed when the redox potential of the solution became 423 mV. By the end of the reaction, the solution amount decreased slightly due to evaporation. Therefore, pure water was added to the level of 900 cc before the reaction, thereby obtaining the adjusted solution.

TABLE 4

| | Elapsed time (min) | | | | | |
|---|---|---|---|---|---|---|
| | 0 (start) | 10 | 30 | 60 | 90 | 110 (end) |
| Solution temperature (° C.) | 79.5 | 79.8 | 80.1 | 80.2 | 80.2 | 80.1 |
| pH | 2.12 | 2.09 | 2.09 | 2.10 | 2.11 | 2.11 |
| Redox potential (mV) | 518 | 521 | 540 | 599 | 489 | 423 |

The adjusted solution was cooled to 40° C., and 3.7 g of copper powder was added. The time of adding the copper powder was set as the start of the dehydroperoxidation process reaction.

Extra pure reagent copper powder was used as the copper powder, but the use of copper fillings or the like is also possible in actual operations. Note, the copper powder can be repeatedly used until completely dissolved. The reaction was completed in a short period of time, and the adjusted solution was obtained. In this example, the amount of Cu consumed in the reaction, that is, the Cu concentration in the adjusted solution after the completion of the reaction, was 136 mg/l.

The changes in solution temperature, pH, and redox potential of the adjusted solution from the start to end of the dehydroperoxidation process reaction are shown in Table 5.

TABLE 5

| | Elapsed time (min) | | | | |
|---|---|---|---|---|---|
| | 0 (immediately before adding copper powder) | 1 (after adding copper powder) | 1.5 | 2 | 2.5 (end) |
| Solution temperature (° C.) | 41 | 42 | 42 | 42 | 42 |
| pH | 1.77 | 1.80 | 1.81 | 1.81 | 1.81 |
| Redox potential (mV) | 395 | 132 | 110 | 96 | 88 |

4. Crystallizing Step

The adjusted solution was diluted with pure water, and the concentration of arsenic was adjusted to 45 g/l. 800 cc of the adjusted solution was transferred to a 2 L beaker, and 95% sulfuric acid was added to bring the pH to 1.15. 200 g of ferrous sulfate ($FeSO_4.7H_2O$) which is ferrous salt ($Fe^{2+}$) having the number of moles of 1.5 times the number of moles of arsenic contained in the adjusted solution was transferred and dissolved, and then 95% sulfuric acid was added to bring the pH to 1.0 at a temperature of 30° C. Note, the ferrous sulfate used was extra pure reagent ferrous sulfate. Subsequently, the solution was heated to 95° C., oxygen gas was started to be blown in at a rate of 950 cc/min using a glass tube from the bottom of the 2 L beaker, a high temperature oxidation reaction was induced for 7 hours under vigorous mixing to make a gas and liquid mixture, and scorodite crystals were produced.

The rate of converting the arsenic in the solution to scorodite by the high temperature oxidation reaction, the composition of the generated scorodite, and the result of dissolution test in conformance with the Japanese Environmental Agency Notice 13 are shown in Table 6.

Moreover, the results of X-ray diffraction of the scorodite are shown in FIG. 2.

TABLE 6

| As precipitation rate (note 1) (%) | Scorodite | | | | | | | |
|---|---|---|---|---|---|---|---|---|
| | Water content (%) | Composition (%) | | Elution value (mg/l) | | | | |
| | | As | Fe | As (note 2) | Pb | Cd | Hg | Se |
| 98.0 | 10.3 | 31.5 | 24.7 | <0.01 | <0.01 | <0.01 | <0.005 | <0.1 |

(note 1) As precipitation rate: rate of conversion of arsenic in solution to scorodite
(note 2) As elution value: conformance to Japanese Environmental Agency Notice 13

From the results of Table 6 and FIG. 2, it can be confirmed that the scorodite of this example is stable crystals which are easily filterable with almost no arsenic elution.

Example 2

1. Non-Ferrous Smelting Intermediates Containing Arsenic 503 wet·g of the same type of sulfide residue as in Example 1 was measured. A composition of the sulfide residue is shown in Table 7.

TABLE 7

| | Element | | | | | | | | | Water content (%) |
|---|---|---|---|---|---|---|---|---|---|---|
| | As (%) | S (%) | Cu (%) | Pb (%) | Zn (%) | Sb (%) | Bi (%) | Cd (%) | Hg (ppm) | |
| Content | 26.10 | 30.92 | 28.20 | 0.98 | 0.27 | 0.40 | 0.86 | 0.15 | 9 | 42 |

2. Leaching Step (a) Early Leaching Step

The obtained sulfide residue was placed in a 2 L beaker, and pure water was added to repulp to thereby obtain a volume of 1.6 L. The sulfide residue in the pulp form was heated while weakly mixing to a temperature of 90° C. Subsequently, a sodium hydroxide solution of a concentration of 500 g/l was added and the pH was adjusted to 4.1. Next, oxygen gas blowing was started by blowing in oxygen gas at a rate of 800 cc/min using a glass tube from the bottom of the beaker. While vigorously mixing, the addition of the sodium hydroxide solution was continued and leaching was performed with the pH being maintained at 4.1. The addition amount of the sodium hydroxide solution of the concentration of 500 g/l was 76 cc.

(b) Latter Leaching Step

At the point of 6 minutes after the start of the leaching, the maintenance of the pH was stopped (the addition of the sodium hydroxide solution was stopped). While further continuing the oxygen gas blowing, leaching was performed until 130 minutes after the start of the leaching, and the leaching was complete at this point. The pH at the stop of the leaching was 2.33 at 90° C. The grade of the obtained leaching solution is shown in Table 8, and the grade of the obtained leaching residue (washed with water) is shown in Table 9. The arsenic leaching rate was 90.8%.

TABLE 8

| | Element | | | | | | | | |
|---|---|---|---|---|---|---|---|---|---|
| | As (g/l) | Na (g/l) | S (g/l) | Cu (mg/l) | Pb (mg/l) | Zn (mg/l) | Sb (mg/l) | Bi (mg/l) | Cd (mg/l) |
| Content | 45.8 | 16.5 | 11.8 | <1 | 11 | 590 | 146 | <1 | 193 |

TABLE 9

| | Element | | |
|---|---|---|---|
| | As (%) | Cu (%) | S (%) |
| Content | 3.9 | 38.8 | 49.9 |

3. Liquid Adjusting Step 900 cc of the leaching solution was placed in a 1 L beaker and heated. 44.1 g of $H_2O_2$ with a 30% concentration was added for 12 minutes starting from the moment the temperature of the leaching solution reached 40° C. The redox potential of the leaching solution when this hydrogen peroxide addition was completed was 589 mV (Vs; Ag/AgCl) at 78° C. The heating of the leaching solution was continued to 80° C. Note, the mixing was performed to the degree that air did not get mixed in. The changes in solution temperature, pH, and redox potential in the reaction are shown in Table 10.

The reaction was completed when the redox potential of the solution became 420 mV, and the adjusted solution was obtained.

TABLE 10

| | Elapsed time (min) | | | | | |
|---|---|---|---|---|---|---|
| | 0 (start) | 5 | 15 | 30 | 60 | 82 (end) |
| Solution temperature (° C.) | 80.0 | 81.3 | 79.9 | 80.2 | 80.1 | 80.4 |
| pH | 1.78 | 1.78 | 1.79 | 1.79 | 1.78 | 1.77 |
| Redox potential (mV) | 616 | 623 | 622 | 609 | 504 | 420 |

The adjusted solution was cooled to 55° C., and 1.8 g of copper powder was added. The time of adding the copper powder was set as the start of the dehydroperoxidation process reaction.

Extra pure reagent copper powder was used as the copper powder. The reaction was completed in a short period of time, and the adjusted solution was obtained. In this example, the amount of Cu consumed in the reaction, that is, the Cu concentration in the adjusted solution after the completion of the reaction, was 153 mg/l.

The changes in solution temperature, pH, and redox potential of the adjusted solution from the start to end of the dehydroperoxidation process reaction are shown in Table 11.

TABLE 11

| | Elapsed time (min) | | | | |
|---|---|---|---|---|---|
| | 0 (immediately before adding copper powder) | 1 (after adding copper powder) | 2 | 3 | 4 (end) |
| Solution temperature (° C.) | 56.1 | 56.6 | 56.3 | 55.8 | 55.6 |
| pH | 1.55 | 1.56 | 1.56 | 1.56 | 1.55 |
| Redox potential (mV) | 425 | 156 | 130 | 98 | 76 |

4. Crystallizing Step

The adjusted solution was diluted with pure water, and the concentration of arsenic was adjusted to 45 g/l. 800 cc of the adjusted solution was transferred to a 2 L beaker, and 95% sulfuric acid was added to bring the pH to 1.15. 200 g of ferrous sulfate ($FeSO_4 \cdot 7H_2O$) which is ferrous salt ($Fe^{2+}$) having the number of moles of 1.5 times the number of moles of arsenic contained in the adjusted solution was transferred and dissolved, and then 95% sulfuric acid was added to bring the pH to 1.0 at a temperature of 30° C. Note, the ferrous sulfate used was extra pure reagent ferrous sulfate.

Subsequently, the solution was heated to 95° C., oxygen gas was started to be blown in at a rate of 950 cc/min using a glass tube from the bottom of the 2 L beaker, a high temperature oxidation reaction was induced for 7 hours under vigorous mixing to make a gas and liquid mixture, and scorodite crystals were produced.

The rate of converting the arsenic in the solution to scorodite by the high temperature oxidation reaction, the composition of the generated scorodite, and the result of dissolution test in conformance with the Japanese Environmental Agency Notice 13 are shown in Table 12.

TABLE 12

| As precipitation rate (note 1) (%) | Scorodite | | | | | | | |
|---|---|---|---|---|---|---|---|---|
| | Water content (%) | Composition (%) | | Elution value (mg/l) | | | | |
| | | As | Fe | As (note 2) | Pb | Cd | Hg | Se |
| 97.2 | 7.5 | 31.1 | 25.5 | <0.01 | <0.01 | <0.01 | <0.005 | <0.1 |

(note 1) As precipitation rate: rate of conversion of arsenic in solution to scorodite
(note 2) As elution value: conformance to Japanese Environmental Agency Notice 13

From the results of Table 12, it can be confirmed that the scorodite of this example is stable crystals which are easily filterable with almost no arsenic elution.

Example 3

1. Non-Ferrous Smelting Intermediates Containing Arsenic

In Example 3 and Comparative Example 1 described below, to determine the effect of the present invention that performs the leaching step by the aforementioned early leaching step and latter leaching step, the difference between the case when the leaching step is made up of the early leaching step and the latter leaching step and the case when the leaching step is made up of only one step was examined while using the same smelting sulfide.

730 wet·g of the smelting sulfide was placed in a 2 L beaker, and pure water was added to repulp to thereby obtain a volume of 1.6 L. The grade of the smelting sulfide is shown in Table 13.

TABLE 13

| | Element | | | | | | | | | Water content (%) |
|---|---|---|---|---|---|---|---|---|---|---|
| | As (%) | S (%) | Cu (%) | Pb (%) | Zn (%) | Sb (%) | Bi (%) | Cd (%) | Hg (ppm) | |
| Content | 27.74 | 25.23 | 23.60 | 0.75 | 1.18 | 0.45 | 0.87 | 0.38 | 69 | 63 |

2. Leaching Step (a) Early Leaching Step

The smelting sulfide in the pulp form was heated while weakly mixing to a temperature of 90° C. Subsequently, a sodium hydroxide solution of a concentration of 500 g/l was added and the pH was adjusted to 6. Next, oxygen gas blowing was started by blowing in oxygen gas at a rate of 800 cc/min from the bottom of the beaker. While vigorously mixing, the addition of the sodium hydroxide solution was continued and leaching was performed with the pH being maintained at 6.

(b) Latter Leaching Step

At the point of 143 minutes after the start of the leaching, the maintenance of the pH was stopped (the addition of the sodium hydroxide solution was stopped).

While further continuing the oxygen gas blowing, leaching was performed until 210 minutes after the start of the leaching, and the leaching was complete at this point. The pH at the stop of the leaching was 3.49 (90° C.).

The amount of sodium hydroxide solution of the 500 g/l concentration used in the leaching was 62 cc. The grade of the obtained leaching residue (washed with water) is shown in Table 14. The arsenic leaching rate was 92.7%. In addition, the grade of the obtained leaching solution is shown in Table 15, and the details of S analysis values are shown in Table 16.

TABLE 14

| | Element | | |
|---|---|---|---|
| | As (%) | Cu (%) | S (%) |
| Content | 3.02 | 32.50 | 46.41 |

TABLE 15

| | Element | | | | | | | | |
|---|---|---|---|---|---|---|---|---|---|
| | As (g/l) | Na (g/l) | S (g/l) | Cu (mg/l) | Pb (mg/l) | Zn (mg/l) | Sb (mg/l) | Bi (mg/l) | Cd (mg/l) |
| Content | 48.4 | 11.8 | 4.0 | <1 | 5 | 456 | 133 | <1 | 93 |

TABLE 16

| | Sulfur | | |
|---|---|---|---|
| | Whole sulfur (g/l) | $SO_4^{2-}$ (g/l) | Other than $SO_4^{2-}$ (g/l) |
| Content | 4.0 | 4.0 | — |

3. Liquid Adjusting Step

This example was intended for the comparison with Comparative Example 1 described below, and therefore the liquid adjusting step was not performed.

4. Crystallizing Step

The leaching solution obtained in the above leaching step was diluted with pure water, and the concentration of arsenic was adjusted to 45 g/l. 800 cc of the diluted solution was transferred to a 2 L beaker, and 95% sulfuric acid was used to bring the pH to 1.15. 200 g of extra pure reagent ferrous sulfate ($FeSO_4 \cdot 7H_2O$) was transferred and dissolved, and then 95% sulfuric acid was added to bring the pH to 1.0 at a temperature of 30° C. The number of moles of ferrous salt ($Fe^{2+}$) added here was 1.5 times the number of moles of arsenic contained.

Subsequently, the solution in which the ferrous sulfate was dissolved was heated to 95° C., oxygen gas was started to be blown in at a rate of 950 cc/min using a glass tube from the bottom of the beaker, and a high temperature oxidation reaction was induced for 7 hours under vigorous mixing to make a gas and liquid mixture.

As a result of X-ray diffraction, it was confirmed that the scorodite generated as a result of the high temperature oxidation reaction was the same scorodite as shown in FIG. 2.

The generated scorodite crystals had excellent sedimentation and filtering properties, and also the As elution value was 0.26 mg/l that satisfies the regulation value (<0.3 mg/l). The reason why the as elution value was 0.26 mg/l, though still within the regulation value, is thought to be the low arsenic precipitation rate in the crystallizing step, that is, the high trivalent arsenic concentration in the solution.

The rate of converting the arsenic in the solution to scorodite by the high temperature oxidation reaction, and the water content and arsenic elution value of the generated scorodite are shown in Table 20.

Comparative Example 1

1. Non-Ferrous Smelting Intermediates Containing Arsenic

In the same way as in Example 3, 730 wet·g of the smelting sulfide shown in Table 13 was placed in a 2 L beaker, and pure water was added to repulp to thereby obtain a volume of 1.6 L.

2. Leaching Step

The smelting sulfide in the pulp form was heated while weakly mixing to a temperature of 90° C. In Comparative Example 1, a sodium hydroxide solution of a concentration of 500 g/l was added and the pH was adjusted to 7. Next, oxygen gas blowing was started by blowing in oxygen gas at a rate of 800 cc/min using a glass tube from the bottom of the beaker. While vigorously mixing, leaching was performed for 225 minutes, with the pH being maintained at 7 by the addition of the sodium hydroxide solution.

The amount of sodium hydroxide solution of the 500 g/l concentration used was 188 cc. The grade of the obtained leaching residue (washed with water) is shown in Table 17. The arsenic leaching rate was 91.2%. In addition, the grade of the obtained leaching solution is shown in Table 18, and the details of S analysis values are shown in Table 19.

TABLE 17

| | Element | | |
|---|---|---|---|
| | As (%) | Cu (%) | S (%) |
| Content | 3.15 | 35.80 | 45.09 |

TABLE 18

| | Element | | | | | | | | |
|---|---|---|---|---|---|---|---|---|---|
| | As (g/l) | Na (g/l) | S (g/l) | Cu (mg/l) | Pb (mg/l) | Zn (mg/l) | Sb (mg/l) | Bi (mg/l) | Cd (mg/l) |
| Content | 44.9 | 30.4 | 15.2 | 2 | 122 | 63 | 487 | 118 | 8 |

TABLE 19

| | Sulfur | | |
|---|---|---|---|
| | Whole sulfur (g/l) | $SO_4^{2-}$ (g/l) | Other than $SO_4^{2-}$ (g/l) |
| Content | 15.2 | 13.3 | 1.9 |

3. Liquid Adjusting Step

The liquid adjusting step was not performed.

4. Crystallizing Step

The same crystallizing step as in the aforementioned Example 3 was performed.

The crystals generated by the high temperature oxidation reaction were determined as scorodite as a result of X-ray diffraction.

The generated scorodite crystals had no sedimentation and poor filterability. The As elution value was 28 mg/l that does not satisfy the regulation value (<0.3 mg/l), and the water content was as high as 69%.

The rate of converting the arsenic in the solution to scorodite by the high temperature oxidation reaction, and the water content and arsenic elution value of the generated scorodite are shown in Table 20.

TABLE 20

| | Scorodite | | |
|---|---|---|---|
| | As precipitation rate (note 1) (%) | Water content (%) | As elution value (note 2) (mg/l) |
| Example 3 | 60 | 13 | 0.26 |
| Comparative Example 1 | 86 | 69 | 28 |

(note 1) As precipitation rate: rate of conversion of arsenic in solution to scorodite
(note 2) As elution value: conformance to Japanese Environmental Agency Notice 13

SECOND EMBODIMENT

According to the research of the present inventors, the above oxidation method using hydrogen peroxide ($H_2O_2$) achieves approximately 100% oxidation of trivalent arsenic by accelerating the trivalent arsenic oxidation speed and causing the reaction at a high solution temperature. However, hydrogen peroxide is an expensive agent.

On the other hand, the oxidation method using ozone ($O_3$) achieves approximately 100% oxidation of trivalent arsenic in a short period of time, irrespective of solution temperature. However, this oxidation method has the following problems.

Ozone generating equipment itself requires high costs. Furthermore, ozone has strong oxidizing power, so that the specification of peripheral apparatuses needs to be upgraded. This results in extremely high costs for the system as a whole.

Because ozone is hazardous to humans, an ancillary facility for collecting and detoxifying ozone that is released to the atmosphere without reaction is necessary.

Ozone is easy to dissolve in water than oxygen gas, and the solution after reaction has a peculiar pungent odor. To resolve this problem, a process of removing dissolved ozone in a subsequent step is necessary.

Meanwhile, it became clear that the method of adding powdery metallic copper or the like as a catalyst has the following problems.

1) In the case where the solution to be treated has a low arsenic concentration (for example, approximately 3 g/L), the oxidation rate of arsenic is approximately 100%. However, in the case where the solution to be treated has a high arsenic concentration (for example, 60 to 70 g/L), the oxidation rate of arsenic drops to approximately 79%.

2) When metallic copper($Cu^{\circ}$) changes to copper ions ($Cu^{2+}$), the change of trivalent arsenic to pentavalent arsenic is affected. In addition, at the time of this change, at least the number of moles of metallic copper equivalent to trivalent arsenic is required. Furthermore, the same effects as metallic copper are confirmed even in a poor water soluble copper compound ($Cu_2O$, CuS). As a result, a large amount of agent (copper source) is necessary when processing arsenous acid being a trivalent arsenic compound.

3) As explained in the above 2), this method uses a large amount of copper source when processing arsenous acid (trivalent arsenic). As a result, copper ions as many as several tens of g/L remain in the solution after the reaction. Therefore, a process of recovering copper from the solution after the reaction is necessary, which causes an increase in copper recovery costs.

4) This reaction is conducted in the acidic solution (for example, the pH is 0 and the FA (free acid) value is 130 g/L), so that a large amount of acid content remains in the solution after the reaction. In order to produce a pentavalent arsenic compound based on the solution after the reaction, a large amount of alkali is necessary. This is an inevitable problem as this method requires dissolving powdery metallic copper and/or a poor water-soluble copper compound, that is, acid content is essential for this method.

Hereinafter, with regard to a second embodiment for implementing the present invention, the 1. Processing object; 2. Oxidation reaction of trivalent arsenic; 3. pH of trivalent arsenic at the beginning of the oxidation reaction; 4. pH of trivalent arsenic at the stop of the oxidation reaction; and Examples 4 to 8 and Comparative Examples 2 to 6 will be described in order in detail while referring to the flowchart shown in FIG. 3, and further the 5. Trivalent arsenic oxidation reaction model conceived by the present inventors will be described.

According to this embodiment, by using materials that can be easily obtained in non-ferrous smelters, trivalent arsenic can be oxidized to pentavalent arsenic at an oxidation rate of 99% or more with low operation costs and low equipment costs.

1. Processing Object

This embodiment is an optimum processing method for producing a highly concentrated arsenic solution.

In other words, according to this embodiment, trivalent arsenic of low solubility can be easily oxidized to pentavalent arsenic of high solubility. Therefore, by using diarsenic trioxide <1> which is solid as the trivalent arsenic source, the diarsenic trioxide dissolves simultaneously with the oxidation of trivalent arsenic to pentavalent arsenic, which ensures the timely supply of trivalent arsenic. As a result, a pentavalent arsenic solution of a concentration as high as several tens of g/L, that is, a concentrated arsenic acid solution can be easily produced.

2. Oxidation Reaction of Trivalent Arsenic

In order to derive this embodiment relating to the oxidation step <4>, the present inventors investigated the step of oxidizing trivalent arsenic by oxygen gas, using copper as an oxidation catalyst for arsenic.

Several points that are subject to the investigation are given below.

1) Using only copper ions as an oxidation catalyst (corresponding to Comparative Examples 3 and 4 described later).

2) Using only copper sulfide as an oxidation catalyst (corresponding to Comparative Example 5 described later).

3) Using the two types of oxidation catalysts of copper sulfide and copper ions together (corresponding to Comparative Example 6 described later).

4) Using the three types of oxidation catalysts of copper sulfide, copper ions, and a copper pentavalent arsenic compound together (corresponding to Examples 4 to 8 described later).

As a result of the above investigation, the oxidation catalyst effects of copper were observed in all of 1) to 4). However, 4) was found to have dramatic improvements in the oxidation catalyst effects of copper when compared with 1) to 3), in terms of oxidation speed and oxidation rate.

Based on this discovery, it was determined that copper sulfide, copper ions, and a copper pentavalent arsenic compound (copper arsenate) are used together as oxidation catalysts.

Hereinafter, (a) copper sulfide source, (b) copper ion source, (c) copper pentavalent arsenic compound (copper arsenate), (d) reaction temperature, and (e) blowing gas type and blowing amount will be described in detail.

(a) Copper Sulfide Source

Copper sulfide solid, copper sulfide powder, and the like can be used as the copper sulfide source <2>. Furthermore, the powdery state is preferable from the perspective of ensuring reactivity. In addition, copper sulfide can be mainly classified into the two compositions of CuS and $Cu_2S$ (there is also $Cu_9S_5$ being a composition in which a portion of copper in crystal lattice is defective). In this embodiment, any of them is effective, and a mixture of them is also possible. Moreover, the copper sulfide source is preferably as pure copper sulfide as possible (copper sulfide of high purity with minimum impurities). This is because contamination with $As_2S_3$, ZnS, PbS, CdS, and the like can be avoided by using copper sulfide of high purity.

If contaminated with $As_2S_3$, ZnS, PbS, CdS, and the like occurs, the following reactions occur. As a result, the supply of copper ions necessary for the oxidation reaction of trivalent arsenic is hindered. (Equation 20~23)

Furthermore, regarding $As_2S_3$, that is, arsenic sulfide, even when copper ions are added consciously, the following reaction occurs, which not only makes the maintenance of an optimum copper ion concentration difficult, but also causes hydrogen ion ($H^+$) evolution reaction. When hydrogen ions ($H^+$) are generated, the pH of the reaction system drops. This makes it difficult to maintain the oxidation reaction of trivalent arsenic according to the present invention, and makes it difficult to oxidize trivalent arsenic.

$$Cu^{2+}+1/3As_2S_3+4/3H_2O=CuS+2/3HAsO_2+2H^+ \quad \text{(Equation 20)}$$

$$Cu^{2+}+ZnS=CuS+Zn^{2+} \quad \text{(Equation 21)}$$

$$Cu^{2+}+PbS=CuS+Pb^{2+} \quad \text{(Equation 22)}$$

$$Cu^{2+}+CdS=CuS+Cd^{2+} \quad \text{(Equation 23)}$$

Consider the case where copper sulfide recovered as smelting intermediates is used as the copper sulfide source <2>. The recovered copper sulfide contains substantial amounts of the aforementioned $As_2S_3$, ZnS, PbS, CdS, and the like. Therefore, it is not preferable to use the copper sulfide recovered as smelting intermediates directly as the copper sulfide source <2>. However, the recovered copper sulfide can be used if the aforementioned sulfides are removed beforehand by decomposition reaction or the like to thereby increase the purity as copper sulfide.

In copper smelters, copper sulfide of high purity suitable for the present invention can be easily produced according to the following method.

(1) Electrolytic copper is dissolved (Cu=10 to 30 g/L) by aeration while heating under sulfite acidic conditions (FA (free acid)=50 to 300 g/L), to obtain a copper solution.

(2) The obtained copper solution is reacted with a sulfidizing agent such as NaSH or $H_2S$ at a temperature of 50° C. or more, to recover copper sulfide.

(3) The recovered copper sulfide is washed with water to remove adhered acid content.

The copper sulfide after the water cleaning has little impurities, and is suitable for the present invention in any of the dry condition and the wet condition.

(b) Copper Ion Source

A substance that becomes copper ions in the solution to be treated can be used as the copper ion source <3>. For example, copper sulfide is preferable, as it is solid at ordinary temperatures, but dissolves into water and immediately becomes copper ions. Though metallic copper or metallic copper powder can also be used, it is necessary to wait for the dissolution until they are ionized.

(c) Copper Pentavalent Arsenic Compound (Copper Arsenate)

Copper arsenate is available as the copper pentavalent arsenic compound according to the present invention. Copper arsenate has a solubility product comparable to iron arsenate ($FeAsO_4$), and is a pentavalent arsenic compound that is easily formed in the weakly acidic to neutral region.

In this embodiment, copper sulfide is added to the solution containing trivalent arsenic with the initial pH value being set to 2 or more, and the oxidation reaction is started. Thus, the oxidation of the trivalent arsenic to pentavalent arsenic and the supply of copper ions by the dissolution of the copper sulfide occur simultaneously on the surface of the added copper sulfide, and therefore the generation of copper arsenate is though to occur instantaneously. When the reaction is complete, the solution is naturally transferred to the weakly acidic region. By this time, however, the pentavalent arsenic and the copper ions are both concentrated to the order of g/L. Due to this concentration, the generative capacity of the copper arsenate will not decrease.

At this point, unless the pH of the solution sinks below 1 into the acidic state, the forming capacity of the copper arsenate will not decrease significantly. Accordingly, it is preferable to control the pH.

(d) Reaction Temperature

The oxidation of arsenic is preferably performed at a higher solution temperature. Specifically, a temperature of 50° C. or more is required for the progress of the oxidation of arsenic. The solution is heated <5> to 70 to 90° C. and preferably about 80° C., in consideration of real operation and based on the premise such as the material quality of the reaction tank and the filtering operation after the reaction.

(e) Blowing Gas Type and Blowing Amount

The oxidation reaction of trivalent arsenic is possible even when the blowing gas <6> is air. However, when oxygen gas or a gas mixture of air and oxygen gas is used as the blowing gas <6>, the oxidation speed is maintained even in the range where the arsenic concentration in the solution is low, and the blowing (gas) capacity decreases. As a result, heat loss associated with this is reduced, and the maintenance of the reaction temperature becomes easier. Therefore, it is preferable to use oxygen gas or a gas mixture of oxygen gas and air as the blowing, gas <6>, in terms of the oxidation speed and the reaction temperature maintenance.

Regarding the blowing amount per unit time of the blowing gas <6>, its optimum value changes depending on the gas-liquid mixing state in the reaction tank. For example, by using a microscopic bubble generation apparatus and the like, the oxidation efficiency can be further improved, and the blowing amount can be reduced.

Therefore, at the time of real operation, it is important to find the optimum value in consideration of the gas-liquid mixing state, the oxygen gas blowing method, and the like.

3. pH of Trivalent Arsenic at the Beginning of the Oxidation Reaction

A basic equation of the oxidation reaction of trivalent arsenic according to the present invention is thought to be the following.

$$As_2O_3 + H_2O = 2HAsO_2 \quad \text{(Equation 24)}$$

Reaction in which diarsenic trioxide dissolves in water as arsenous acid (trivalent arsenic).

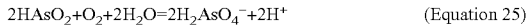

$$2HAsO_2 + O_2 + 2H_2O = 2H_2AsO_4^- + 2H^+ \quad \text{(Equation 25)}$$

Reaction in which arsenous acid (trivalent arsenic) oxides.

$$2HAsO2 + O2 + 2H2O = 2H3AsO4 \quad \text{(Equation 26)}$$

Reaction in which arsenous acid (trivalent arsenic) oxides.

As in the examples described later, in the case of the concentrated solution whose arsenous acid concentration at the time of complete arsenic dissolution is 40 g/L or more, the solubility of arsenous acid is small, and therefore diarsenic trioxide does not dissolve totally in the initial stage.

In the case of the concentrated arsenic solution, simultaneously with the oxidation of arsenous acid to arsenate of high solubility according to (Equation 25) and (Equation 26) and the decrease of the arsenous acid concentration, the reaction in which arsenous acid is added into the system is thought to proceed. In other words, the solid diarsenic trioxide is thought to dissolve while being suspended in (Equation 24) the initial stage of the reaction.

At this point, the oxidation of arsenous acid to arsenate is thought to be in accordance with (Equation 25) and (Equation 26).

In the oxidation reaction of arsenous acid to arsenate, the behavior in which the pH of the solution rapidly decreases to about 2 is shown in initial 30 minutes. From this behavior, it can be estimated that the oxidation mainly proceeds according to (Equation 25) in the neutral region where the pH is 2 or more. Meanwhile, the decrease of the pH becomes gradual in the subsequent 30 minutes, and so it can be estimated that the reaction mainly proceeds according to (Equation 26).

In view of the above, it can be understood that the efficient oxidation of trivalent arsenic and the control of the pH at the stop of the reaction to the weakly acidic state according to the present invention can be achieved by setting the pH at the beginning of the oxidation reaction (when the air and/or oxygen gas blowing starts) to 2 or more.

4. pH of Trivalent Arsenate at the Stop of the Oxidation Reaction

In this embodiment according to the present invention, the pH of trivalent arsenate at the stop of the oxidation reaction (when the air and/or oxygen gas blowing stops) was below 2 and more specifically about 1.8 in all cases, as shown by the results of Examples 4 to 8 described later.

This pH of about 1.8 is a preferable pH for producing a pentavalent arsenic compound (the acid concentration is at an adequate level). This is because the optimum pH range for producing iron arsenate which is a pentavalent arsenic compound is pH=3.5 to 4.5, and so the neutralizing agent consumed for neutralizing acid content can be reduced.

On the other hand, in the production of scorodite ($FeAsO_4 \cdot 2H_2O$), the pentavalent arsenic solution whose pH is about 1 is used as the stock solution, and therefore the pH can be adjusted by adding a small amount of inverse neutralizing agent (for example, sulfuric acid). Furthermore, the pH at the stop of the reaction is preferably not less than 1 and below 2, though the details will be described in Example 8 below.

The pH at the stop of the trivalent arsenic oxidation reaction (when the air and/or oxygen blowing stops) being below 2 and specifically about 1.8 is thought to be derived from the above (Equation 24) to (Equation 26).

First, according to (Equation 24), diarsenic trioxide is dissolved in water as arsenous acid (trivalent arsenic). Furthermore, this is not limited to the case where the starting row material is the solid diarsenic trioxide, but also applies to the case of the aqueous solution in which arsenic trioxide has already been dissolved as arsenous acid (therefore, the present invention is thought to be applicable to ordinary drainage treatment).

The product obtained in the above oxidation step <4> is separated in the filtering <7> into the filtrate <8> and the filtrand <9>. In the filtering <7>, an ordinary filtering method such as filter press can be applied. This is because, though a copper pentavalent arsenic compound is generated in the above oxidation step <4>, there is no problem of filterability such as increased viscosity.

The obtained filtrate <7> is an arsenate solution having a pH of about 1.8 as mentioned above. Since the pH of about 1.8 is preferable for producing pentavalent arsenic compounds, a pentavalen arsenic compound can be produced from the filtrate <7> with low costs and high productivity.

On the other hand, the filtrand <9> is a mixture of copper sulfide and a copper pentavalent arsenic compound, and accordingly can be repeatedly used as it is as an oxidation catalyst. When repeatedly using this, the catalyst effect can be expected to increase by newly adding copper sulfide of an amount equivalent to partially dissolved copper sulfide.

5. Trivalent Arsenic Oxidation Reaction Mechanism Model

The ternary catalyst made up of copper sulfide, copper ions, and a copper pentavalent arsenic compound according to the present invention has both a high oxidation rate and a high oxidation speed. The oxidation catalyst effects exhibited by this ternary catalyst is thought to be derived from the battery-like reaction caused by the contact of each type of ions on the copper sulfide surface.

For example, consider the model of the oxidation reaction mechanism using the region of about pH=2 as an example.

First, substituting the trivalent arsenic oxidation to electrode reactions yields (Equation 27) showing the anodic reaction and (Equation 28) showing the cathodic reaction.

$$As_2O_3+5H_2O=2H_3OAsO_4+4H^++4e^- \quad \text{(Equation 27)}$$

$$4H^++O_2+4e^-=2H_2O \quad \text{(Equation 28)}$$

In other words, the oxidation reaction of trivalent arsenic proceeds as shown in (Equation 27), but it is necessary to maintain electrical neutralization in order to have the reaction proceed. Therefore, the reactivity depends on the progress of the cathodic reaction shown in (Equation 28) which proceeds on the copper sulfide surface. Due to this, it is thought to be important to secure the copper sulfide surface which always has a high activation level.

Which is to say, in the present reaction model system, copper ions coexist and also the reaction occurs in the weakly acidic pH region, and therefore the crystallizing reaction of the copper sulfide compound as shown in (Equation 29) is thought to occur on the copper sulfide surface.

$$Cu^{2+}+H_3AsO_4+H_2O=CuHAsO_4.H_2O+2H^+ \quad \text{(Equation 29)}$$

According to (Equation 29), it can be considered that hydrogen ions (H$^+$) are added to the copper sulfide surface and the reactions shown in (Equation 30) and (Equation 31) proceed simultaneously.

$$CuS+2H^++1/2O_2=Cu^{2+}+S^\circ+H_2O \quad \text{(Equation 30)}$$

$$CuS+H^++2O_2=Cu^{2+}+HSO_4^- \quad \text{(Equation 31)}$$

At this time, the copper arsenate compound is formed on the copper sulfide surface, so that the oxygen gas supply becomes insufficient and (Equation 30) the S° (monatomic sulfur) generating reaction as shown in (Equation 30) is likely to proceed. Further, with the progress of (Equation 30) and (Equation 31), it is estimated that the Cu ion concentration increases locally and also the hydrogen ion (H$^+$) concentration decreases. At this location, the copper sulfide generating reaction shown in (Equation 32) is thought to proceed simultaneously with the above (Equation 30) and (Equation 31).

$$Cu^{2+}+4/3S^\circ+4/3H_2O=CuS+1/3HSO_4^-+7/3H^+ \quad \text{(Equation 32)}$$

(Equation 32) shows the crystallization of CuS which is copper sulfide, and indicates that the CuS crystallization is ensured on the copper sulfide surface as the newly-formed surface of high activity.

Furthermore, the hydrogen ions (H$^+$) generated in (Equation 32) are supplied to the reactions shown in (Equation 30) and (Equation 31), and also consumed in the dissolution reaction of the copper arsenate compound (the inverse reaction of (Equation 29)). As a result, the addition of copper ions to the copper sulfide surface and the dispersion of arsenic acid (H$_3$AsO$_4$) to the periphery are thought to proceed.

Note, in the condition of pH=0 shown in Comparative Example 6 below, basically the reaction shown in (Equation 29) does not proceed and the reaction shown in (Equation 32) does not proceed easily, and so it is interpreted that the oxidation efficiency drops significantly.

Examples

Example 4

Diarsenic trioxide of reagent grade (the grade is shown in Table 21) and copper sulfide of reagent grade (the grade is shown in Table 22) were prepared.

As described above, copper sulfide can be mainly classified into the two forms of CuS and Cu$_2$S, and there is also a composition Cu$_9$S$_5$ in which a portion of copper in crystal lattice is defective. Any of these forms is usable, and a mixture of these forms is applicable too.

The results of X-ray diffraction of copper sulfide used in this example are shown in FIG. 4. Note, in FIG. 4, the peak of CuS is plotted as Δ, the peak of Cu$_2$S is plotted as *, and the peak of Cu$_9$S$_5$ is plotted as ♦. From the results of X-ray diffraction, the copper sulfide used in this example is thought to be the mixture of CuS, Cu$_2$S, and Cu$_9$S$_5$.

TABLE 21

| arsenic (%) | sulfur (ppm) | copper (ppm) | zinc (ppm) | lead (ppm) | cadmium (ppm) |
|---|---|---|---|---|---|
| 74.8 | 1,303 | 27 | 11 | 60 | 2 |

TABLE 22

| copper (%) | sulfur (%) | zinc (ppm) | lead (ppm) | cadmium (ppm) |
|---|---|---|---|---|
| 71.2 | 26.1 | 29 | 2 | 1 |

A 1 L beaker was used as the reaction vessel, a 2-stage turbine blade and 4 baffle plates of 700 rpm were used as the mixture device, and the gas blowing was conducted by blowing in oxygen gas using a glass tube from the bottom of the beaker (the oxidation was performed in a gas and liquid mixture in vigorous mixing).

50 g of diarsenic trioxide and 48 g of copper sulfide were introduced in the reaction vessel, 800 cc of pure water was added to repulp, and the solution was heated to 80° C. Next, the mixture of the solution was started using the mixture device, and further the blowing of oxygen gas from the bottom of the reaction vessel was started at 400 cc/min, to oxidize trivalent arsenic. Note, the pH of the solution immediately before the oxygen gas blowing start was 3.09 (at 80° C.).

The solution mixture and the oxygen gas blowing were continued for 90 minutes to oxidize the trivalent arsenic. The temperature, pH, redox potential, copper ion amount, trivalent arsenic amount, and pentavalent arsenic amount of the solution were measured every 30 minutes. The measurement results are shown in Table 23. Note, the redox potential is Ag/AgCl reference electrode value.

TABLE 23

| Elapsed time (minutes) | 30 | 60 | 90 |
|---|---|---|---|
| Temperature (° C.) | 79 | 79 | 79 |
| pH | 2.13 | 1.88 | 1.84 |
| Redox potential (mV) | 298 | 327 | 383 |
| Cu$^{2+}$ (g/L) | 1.8 | 4.0 | 5.6 |

TABLE 23-continued

| Elapsed time (minutes) | 30 | 60 | 90 |
|---|---|---|---|
| Trivalent arsenic (g/L) | 29.2 | 8.3 | 0.2 |
| Pentavalent arsenic (g/L) | 13.9 | 33.2 | 40.7 |
| Oxidation rate (%) | 32.3 | 80.0 | 99.5 |

After the oxidation of the trivalent arsenic was continued for 90 minutes, the solution was filtered, the catalyst recovered as the residue was washed with water, and the grade analysis and X-ray diffraction of the catalyst were performed. The grade analysis results and X-ray diffraction results of the catalyst after the reaction are shown in Table 24 and FIG. 5, respectively. In FIG. 5, the peak of Cu is plotted by Δ, and the peak of the copper pentavalent arsenic compound is plotted by ○.

TABLE 24

| copper (%) | sulfur (%) | arsenic (%) |
|---|---|---|
| 54.2 | 22.6 | 10.5 |

From Table 23, Table 24, and FIG. 5, it can be understood that copper sulfide, copper ions, and a copper pentavalent arsenic compound (copper arsenate) coexist in the reaction system according to Example 4.

Moreover, it can be understood that the oxidation speed and the oxidation rate of the trivalent arsenic are high in Example 4. In particular, it was confirmed that the oxidation rate of 99% or more was already reached at the point of 90 minutes after the oxidation reaction start.

Example 5

The same operations and measurements as in Example 4 were performed except that the amount of copper sulfide introduced in the reaction vessel was 24 g which is one half.

Note, the pH of the solution immediately before the oxygen gas blowing start was 2.96 (at 80° C.).

The results of measuring the temperature, pH, redox potential, copper ion amount, trivalent arsenic amount, and pentavalent arsenic amount of the solution every 30 minutes are shown in Table 25, and the analysis results of the grade of the catalyst recovered as the residue and washed with water are shown in Table 26.

TABLE 25

| Elapsed time (minutes) | 30 | 60 | 90 | 120 |
|---|---|---|---|---|
| Temperature (° C.) | 79 | 80 | 80 | 80 |
| pH | 2.17 | 1.88 | 1.80 | 1.79 |
| Redox potential (mV) | 301 | 317 | 336 | 384 |
| Cu$^{2+}$ (g/L) | 1.1 | 2.1 | 3.1 | 4.5 |
| Trivalent arsenic (g/L) | 32.6 | 21.3 | 7.4 | 0.3 |
| Pentavalent arsenic (g/L) | 11.4 | 24.1 | 38.0 | 45.6 |
| Oxidation rate (%) | 25.9 | 53.1 | 83.7 | 99.4 |

TABLE 26

| copper (%) | sulfur (%) | arsenic (%) |
|---|---|---|
| 63.4 | 29.4 | 2.3 |

In Example 5, the CuS additive amount is reduced by half of Example 4, to examine the effects of this reduction by half.

As a result, the oxidation speed of trivalent arsenic decreased a little when compared with Example 4, but the oxidation capacity was sufficiently maintained, and the oxidation of 99% or more was observed at the point of 120 minutes after the oxidation reaction start. As with Example 4, the oxidation capacity and speed of trivalent arsenic can both be considered favorable for practical use.

Example 6

This example is similar to Example 4, but further 16 g of copper sulfide of reagent grade (CuSO$_4$.5H$_2$O) was introduced into the reaction vessel. The amount of copper sulfide introduced is equivalent to 5 g/L as copper ions. This example relates to the case of increasing the copper ion concentration than in the initial stage of the reaction.

Note, the pH of the solution immediately before the oxygen gas blowing start was 2.98 (at 80° C.).

The results of measuring the temperature, pH, redox potential, copper ion amount, trivalent arsenic amount, and pentavalent arsenic amount of the solution every 30 minutes are shown in Table 27.

In this example, the oxygen gas blowing was stopped at 120 minutes when the reaction ended. After this, a NaOH solution of concentration 500 g/L was added to neutralize the solution to pH=3.5, copper ions existing in the solution were crystallized as a pentavalent arsenic compound, and then the filtering operation was performed. Note, the additive amount of the NaOH solution was 40 cc.

The total arsenic concentration in the filtrate obtained as a result of the filtering operation was 29.6 g/L, while the copper concentration was 80 mg/L. Thus, the concentration decrease associated with the formation of the copper arsenate compound was observed.

On the other hand, the residue recovered as a result of the filtering operation was 165 g·wet. Extracting 5 g·wet of this residue and measuring the moisture content produced the results that the moisture content=59.9%. In addition, 5 g·wet of the residue was washed with water and the grade was analyzed. The analysis results of the grade of the recovered residue are shown in Table 28.

TABLE 27

| Elapsed time (minutes) | 30 | 60 | 90 | 120 |
|---|---|---|---|---|
| Temperature (° C.) | 79 | 79 | 80 | 80 |
| pH | 1.84 | 1.86 | 1.90 | 1.79 |
| Redox potential (mV) | 299 | 321 | 356 | 386 |
| Cu$^{2+}$ (g/L) | 6.1 | 8.0 | 10.1 | 10.9 |
| Trivalent arsenic (g/L) | 34.7 | 17.0 | 0.7 | 0.2 |
| Pentavalent arsenic (g/L) | 7.9 | 27.9 | 42.8 | 41.0 |
| Oxidation rate (%) | 18.5 | 62.2 | 98.5 | 99.5 |

TABLE 28

| copper (%) | sulfur (%) | arsenic (%) |
|---|---|---|
| 47.5 | 12.1 | 19.7 |

This example 6 increases the Cu ion concentration than in the initial stage of the reaction in Example 4. From the results of Table 27, it can be understood that the reaction was complete at a high oxidation rate in this example, too.

On the other hand, in Example 6, the oxidation speed decreased a little when compared with Example 4. This indicates that the copper ion concentration in the reaction system need not increased more than necessary. It can be judged that the sufficient copper ion concentration in the reaction system is approximately 1 to 5 g/L.

Furthermore, when using copper sulfide immediately after being produced by the wet sulfidation reaction, this copper sulfide has a behavior of poor solubility. In view of this, when using copper sulfide immediately after being produced by the wet sulfidation reaction, the addition of copper ions to the reaction system is effective.

Moreover, Example 6 recovers added copper ions as a copper pentavalent arsenic compound by neutralization. The method of recovering copper ions is not limited to the method of recovering as a copper pentavalent arsenic compound, and may instead be a method of adding an agent that reacts with copper ions and forms copper sulfide, such as monatomic sulfur or ZnS.

Example 7

50 g of diarsenic trioxide of reagent grade was prepared.

The whole residue recovered in Example 6 (except 10 g·wet used for the measurement sample in Example 6) and 50 g of diarsenic trioxide were introduced into the reaction vessel, and 707 cc of pure water was added to repulp, to bring the moisture content in the pulp to be 800 cc. This pulp was heated to 80° C., and then oxygen gas was started to be blown in from the bottom of the reaction vessel at 400 cc/min.

Note, the pH of the solution immediately before the oxygen gas blowing start was 3.03 (at 79° C.).

The results of measuring the temperature, pH, redox potential, copper ion amount, trivalent arsenic amount, and pentavalent arsenic amount of the solution every 30 minutes are shown in Table 29.

TABLE 29

| Elapsed time (minutes) | 30 | 60 | 90 |
|---|---|---|---|
| Temperature (° C.) | 80 | 80 | 79 |
| pH | 2.20 | 1.90 | 1.83 |
| Redox potential (mV) | 294 | 349 | 382 |
| $Cu^{2+}$ (g/L) | 2.2 | 3.2 | 4.7 |
| Trivalent arsenic (g/L) | 24.2 | 2.4 | 0.2 |
| Pentavalent arsenic (g/L) | 24.4 | 48.5 | 52.3 |
| Oxidation rate (%) | 50.2 | 95.3 | 99.6 |

After the reaction for 90 minutes, the oxygen gas blowing was stopped, a NaOH solution of concentration 500 g/L was added to neutralize the solution to pH=3.0, and then the solution was filtered. Note, the amount of the NaOH solution used was 36 cc.

The total arsenic concentration in the filtrate obtained was 44.8 g/L, while the Cu concentration was 210 mg/L. Thus, the recovery of the arsenic concentration approximately equivalent to the composition concentration was observed.

On the other hand, the residue recovered was 122 g·wet. Extracting 5 g·wet of this residue and measuring the moisture content produced the results that the moisture content=48.9%. In addition, 5 g·wet of the residue was washed with water and the grade was analyzed. The analysis results of the grade of the catalyst recovered as the residue are shown in Table 30.

TABLE 30

| copper (%) | sulfur (%) | arsenic (%) |
|---|---|---|
| 44.4 | 10.6 | 21.8 |

This example 7 exhibited highest oxidation efficiency and a highest oxidation speed, in Examples 4 to 8. Specifically, the oxidation of 95% was already observed at the point of 60 minutes from the reaction, and the oxidation rate of 99.6% which is approximately 100% was observed at the point of 90 minutes from the reaction.

The catalyst according to this example 7 is the ternate catalyst of copper sulfide, copper ions, and a copper arsenate compound (copper pentavalent arsenic compound), too. The catalyst according to this example 7 especially has a high content ratio of the copper arsenate compound (copper pentavalent arsenic compound), compared to that of examples 4 and 5. This high content ratio of the copper arsenate compound is thought to contribute to the improved oxidation performance. In other words, as described in "Model of oxidation reaction" this contribution phenomenon demonstrates that the formation and presence of the copper arsenate compound relates to the generation of the newly-formed surface of CuS of high activity.

Example 8

The same operations as in Example 5 were performed except that the pH immediately before the oxygen gas blowing start was adjusted to 1.0 (at 80° C.) by adding concentrated sulfuric acid to the pulp.

The results of measuring the temperature, pH, redox potential, copper ion amount, trivalent arsenic amount, and pentavalent arsenic amount of the solution every 30 minutes are shown in Table 31. Moreover, the catalyst grade after the reaction (washed with water) is shown in Table 32.

TABLE 31

| Elapsed time (minutes) | 30 | 60 | 90 | 120 |
|---|---|---|---|---|
| Temperature (° C.) | 81 | 79 | 80 | 79 |
| pH | 1.22 | 1.15 | 1.15 | 1.13 |
| Redox potential (mV) | 363 | 371 | 375 | 380 |
| $Cu^{2+}$ (g/L) | 4.8 | 5.2 | 5.7 | 6.3 |
| Trivalent arsenic (g/L) | 33.6 | 24.4 | 17.6 | 12.8 |
| Pentavalent arsenic (g/L) | 10.9 | 21.2 | 28.2 | 33.4 |
| Oxidation rate (%) | 24.5 | 46.5 | 61.6 | 72.3 |

TABLE 32

| copper (%) | sulfur (%) | arsenic (%) |
|---|---|---|
| 66.0 | 31.1 | 0.6 |

This example 8 is similar to Example 5 in the amount of copper sulfide added, but the pH of the solution immediately before the oxidation start was adjusted to 1.

As a result, the oxidation capacity decreased when compared with Example 5, and the oxidation rate was 72% at the point of 120 minutes. Though the reaction needs to be performed for a long period of time to reach the oxidation rate of 100%, the oxidation capacity itself is sufficient.

The reason of the above oxidation speed decrease can be attributed to the fact that the coexisting copper sulfide was significantly reduced. Furthermore, when the pH of the solution is 1, the amount of dissolution of copper sulfide increases, so that the amount of copper sulfide recovered without dissolving (amount of recycle) decreases, which is disadvantageous in terms of cost, too.

In view of the above, it is thought to be preferable to start the reaction by setting the pH of the solution to not less than 2 and ending the oxidation reaction with a pH of not less than 1, in terms of ensuring the reactivity and the CuS recovery amount.

Comparative Example 2

The same operation as in Example 4 was performed except that 50 g of diarsenic trioxide of reagent grade alone was introduced in the reaction vessel and 800 cc of pure water was added to repulp.

Note, the pH of the solution immediately before the oxygen gas blowing start was 2.80 (at 80° C.).

The temperature, pH, redox potential, copper ion amount, trivalent arsenic amount, and pentavalent arsenic amount of the solution were measured every 30 minutes. The measurement results are shown in Table 33.

TABLE 33

| Elapsed time (minutes) | 30 | 60 | 90 |
|---|---|---|---|
| Temperature (° C.) | 80 | 79 | 80 |
| pH | 2.71 | 2.68 | 2.67 |
| Redox potential (mV) | 378 | 373 | 370 |
| $Cu^{2+}$ (g/L) | <0.1 | <0.1 | <0.1 |
| Trivalent arsenic (g/L) | 42.0 | 44.0 | 45.5 |
| Pentavalent arsenic (g/L) | 0 | 0.1 | 0.4 |
| Oxidation rate (%) | 0 | 0.2 | 0.9 |

In this comparative Example 2, it was observed that the oxidation of trivalent arsenic proceeded little.

Comparative Example 3

The same operation as in Example 4 was performed except that 50 g of diarsenic trioxide of reagent grade and 16 g of copper sulfide of reagent grade ($CuSO_4.5H_2O$) were introduced in the reaction vessel and 800 cc of pure water was added to repulp.

Note, the pH of the solution immediately before the oxygen gas blowing start was 3.33 (at 80° C.).

The temperature, pH, redox potential, copper ion amount, trivalent arsenic amount, and pentavalent arsenic amount of the solution were measured every 30 minutes. The measurement results are shown in Table 34.

TABLE 34

| Elapsed time (minutes) | 30 | 60 | 90 |
|---|---|---|---|
| Temperature (° C.) | 81 | 79 | 80 |
| pH | 3.22 | 3.16 | 3.10 |
| Redox potential (mV) | 373 | 378 | 382 |
| $Cu^{2+}$ (g/L) | 5.3 | 5.5 | 5.7 |
| Trivalent arsenic (g/L) | 40.3 | 43.6 | 45.3 |
| Pentavalent arsenic (g/L) | 0.5 | 0.9 | 1.3 |
| Oxidation rate (%) | 1.2 | 2.0 | 2.8 |

In this comparative Example 3, though the progress of oxidation was observed when compared with Comparative Example 2, but the degree of progress was still small.

Comparative Example 4

The same operation as in Example 4 was performed except that 50 g of diarsenic trioxide of reagent grade and 32 g of copper sulfide of reagent grade ($CuSO_4.5H_2O$) (10 g/L as copper ions) were introduced in the reaction vessel and 800 cc of pure water was added to repulp.

Note, the pH of the solution immediately before the oxygen gas blowing start was 3.45 (at 80° C.).

The temperature, pH, redox potential, copper ion amount, trivalent arsenic amount, and pentavalent arsenic amount of the solution were measured every 30 minutes. The measurement results are shown in Table 35.

TABLE 35

| Elapsed time (minutes) | 30 | 60 | 90 |
|---|---|---|---|
| Temperature (° C.) | 79 | 81 | 79 |
| pH | 3.29 | 3.20 | 3.25 |
| Redox potential (mV) | 369 | 372 | 378 |
| $Cu^{2+}$ (g/L) | 10.7 | 10.6 | 10.8 |
| Trivalent arsenic (g/L) | 39.5 | 42.5 | 43.4 |
| Pentavalent arsenic (g/L) | 2.5 | 3.0 | 3.5 |
| Oxidation rate (%) | 6.0 | 6.6 | 7.4 |

In this comparative Example 4, the progress of oxidation was observed as a result of increasing the Cu ion concentration in the solution. However, the degree of progress of oxidation was still small, and further addition of copper ions is thought to be necessary. Hence Comparative Example 6 is not suitable for practical use.

Comparative Example 5

The same operation as in Example 4 was performed except that 50 g of diarsenic trioxide of reagent grade, 48 g of copper sulfide of reagent grade (CuS), and 20 g of sulfur powder were introduced in the reaction vessel and 800 cc of pure water was added to repulp.

Note, the pH of the solution immediately before the oxygen gas blowing start was 2.67 (at 80° C.).

The temperature, pH, redox potential, copper ion amount, trivalent arsenic amount, and pentavalent arsenic amount of the solution were measured every 30 minutes. The measurement results are shown in Table 36.

TABLE 36

| Elapsed time (minutes) | 30 | 60 | 90 |
|---|---|---|---|
| Temperature (° C.) | 79 | 79 | 81 |
| pH | 1.75 | 1.65 | 1.63 |
| Redox potential (mV) | 340 | 341 | 343 |
| $Cu^{2+}$ (g/L) | <0.1 | <0.1 | <0.1 |
| Trivalent arsenic (g/L) | 35.2 | 35.3 | 35.4 |
| Pentavalent arsenic (g/L) | 10.4 | 10.7 | 10.9 |
| Oxidation rate (%) | 22.8 | 23.3 | 23.5 |

After the end of the reaction, the solution was filtered, the obtained residue was washed with water, and the grade analysis and X-ray diffraction were performed. The catalyst grade after the reaction (washed with water) is shown in Table 37, and the X-ray diffraction results are shown in FIG. 6.

In FIG. 6, the peak of CuS is plotted by Δ, and the peak of sulfur is plotted by ■.

In the grade analysis, 0.1% arsenic was detected, but this can be considered to result from the unwashed solution adhesion.

From FIG. 6 and Table 37, it can be understood that there is no presence of copper ions and a copper pentavalent arsenic compound in this comparative Example 5 to a single catalyst system of copper sulfide.

TABLE 37

| copper (%) | sulfur (%) | arsenic (%) |
|---|---|---|
| 49.5 | 50.0 | 0.1 |

In this comparative Example 5, the progress of oxidation was observed. This indicates that single copper sulfide has a higher oxidation capacity as a catalyst than single Cu ions used in Comparative Examples 3 and 4. However, the degree of progress of oxidation is still not appropriate in terms of practical use.

Comparative Example 6

The same operation as in Example 4 was performed except that concentrated sulfuric acid was added to pulp, the pH was adjusted to 0 (at 80° C.), and then the oxygen gas blowing was started.

The temperature, pH, redox potential, copper ion amount, trivalent arsenic amount, and pentavalent arsenic amount of the solution were measured every 30 minutes. The measurement results are shown in Table 38.

TABLE 38

| Elapsed time (minutes) | 30 | 60 | 90 | 120 |
|---|---|---|---|---|
| Temperature (° C.) | 80 | 79 | 80 | 80 |
| pH | 0.00 | 0.00 | −0.02 | −0.04 |
| Redox potential (mV) | 411 | 415 | 412 | 411 |
| $Cu^{2+}$ (g/L) | 9.7 | 10.8 | 11.2 | 11.5 |
| Trivalent arsenic (g/L) | 32.7 | 31.9 | 32.6 | 31.6 |
| Pentavalent arsenic (g/L) | 1.7 | 2.8 | 3.5 | 4.8 |
| Oxidation rate (%) | 4.9 | 8.0 | 9.7 | 13.1 |

After the end of the reaction, the solution was filtered, the obtained residue was washed with water, and the grade analysis and X-ray diffraction were performed. The catalyst grade after the reaction (washed with water) is shown in Table 39, and the X-ray diffraction results are shown in FIG. 7. In FIG. 7, the peak of CuS is plotted by Δ, and the peak of diarsenic trioxide is plotted by □.

TABLE 39

| copper (%) | sulfur (%) | arsenic (%) |
|---|---|---|
| 56.2 | 28.9 | 10.6 |

In this comparative Example 6, the oxidation of arsenic did not progress, and 10.6% arsenic was detected even in the catalyst after the reaction. Moreover, since diarsenic trioxide was acknowledged from the X-ray diffraction results as shown in FIG. 7, it can be understood that the diarsenic trioxide remained without dissolving even after the oxidation reaction.

This is thought to be because the solubility of diarsenic trioxide decreased since the oxidation reaction was started in the sulfuric acidified solution having a pH of 0, and also because trivalent arsenic eluted into the solution remains without being oxidized to pentavalent arsenic of high solubility and therefore the trivalent arsenic concentration in the solution did not decrease and a portion of diarsenic trioxide remains without dissolving.

The results of this comparative Example 6 indicate that, when starting the arsenic oxidation reaction under a condition where the pH is 0 which does not allow formation of copper sulfide, the substances that serve as catalysts are the binary system of copper sulfide and copper ions, which results in a significant drop of the oxidation capacity. This demonstrates that the arsenic oxidation reaction according to the present invention is preferably started under a condition where the pH is not less than 1.

Figure 1:
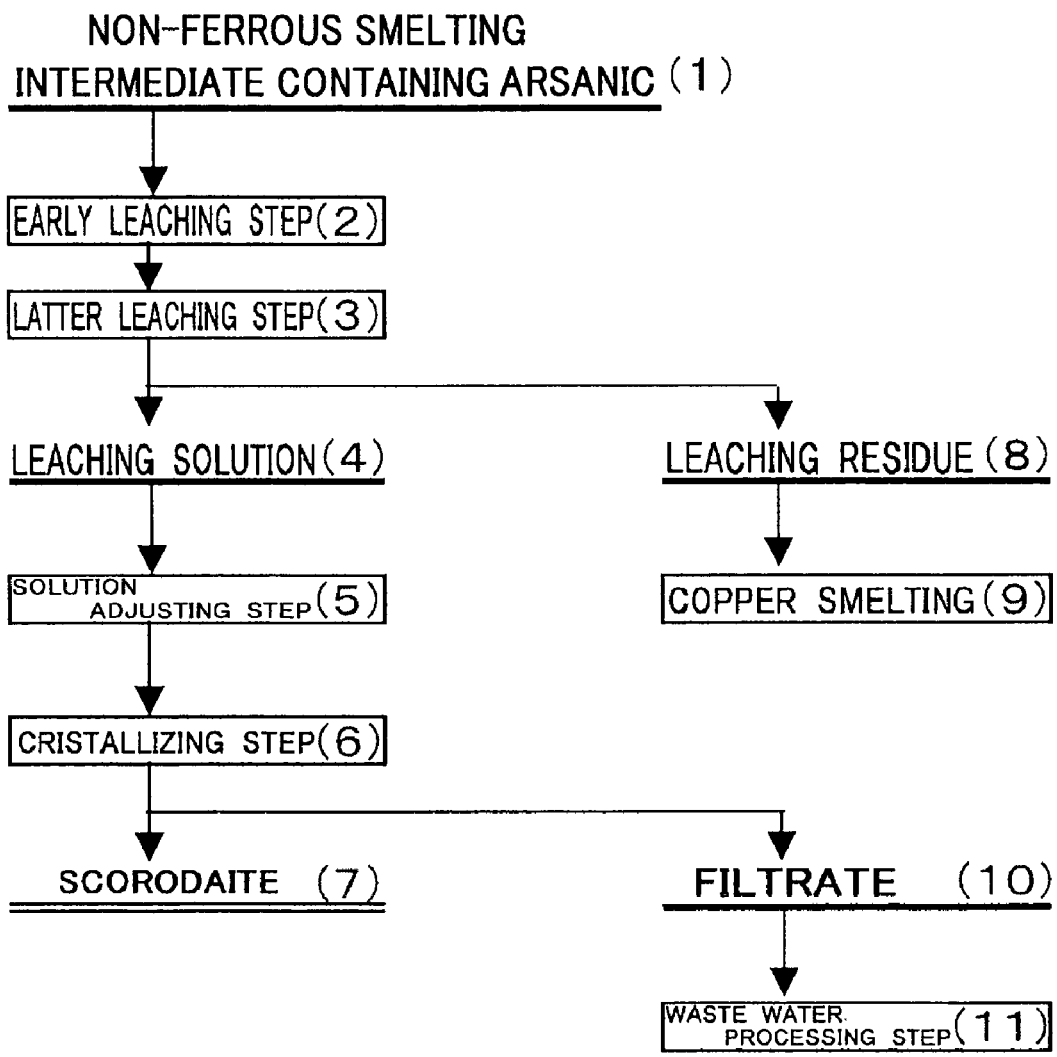
FIG. 1 is a flowchart showing the arsenic processing method of the present invention.
Figure 2:
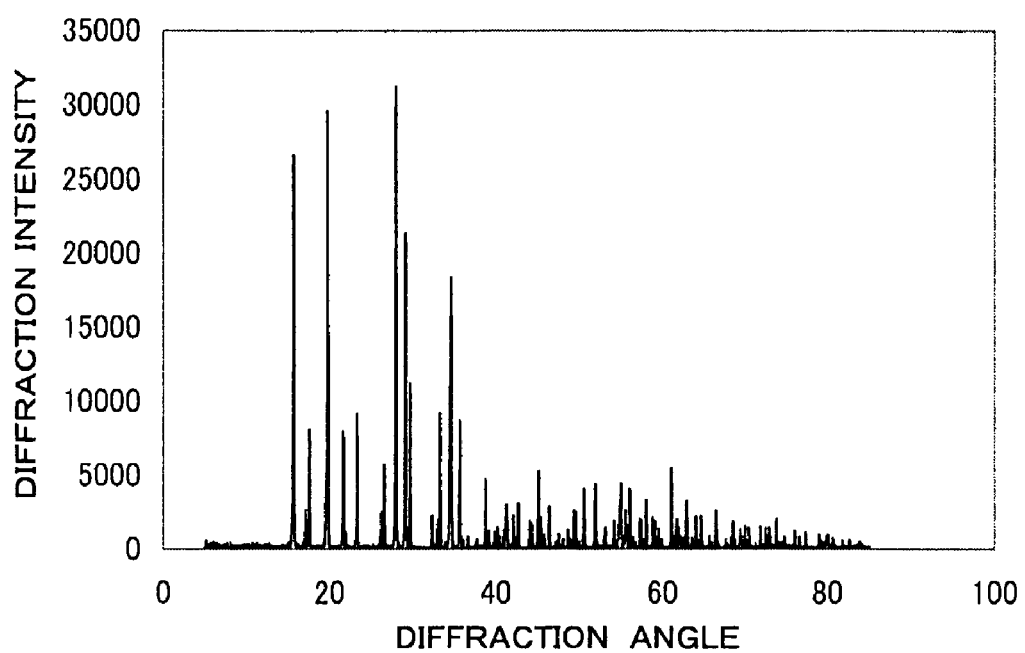
FIG. 2 is a chart showing X-ray diffraction results of scorodite crystals according to a first embodiment.
Figure 3:
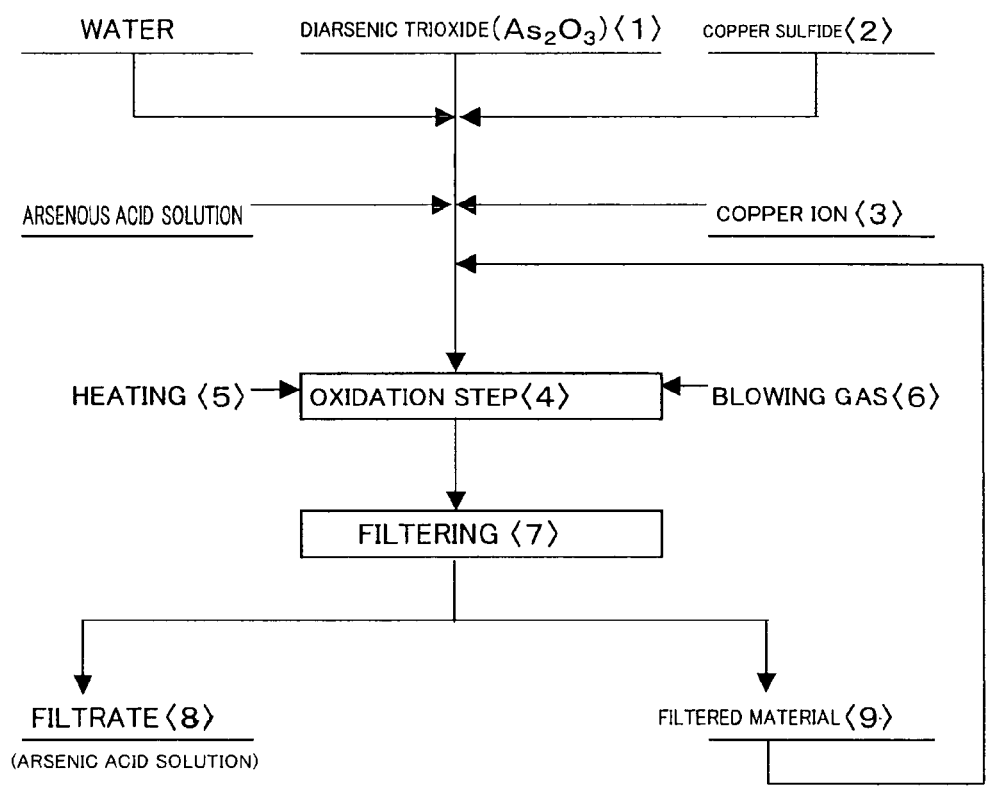
FIG. 3 is a flowchart according to an embodiment (second embodiment) of the present invention.
Figure 4:
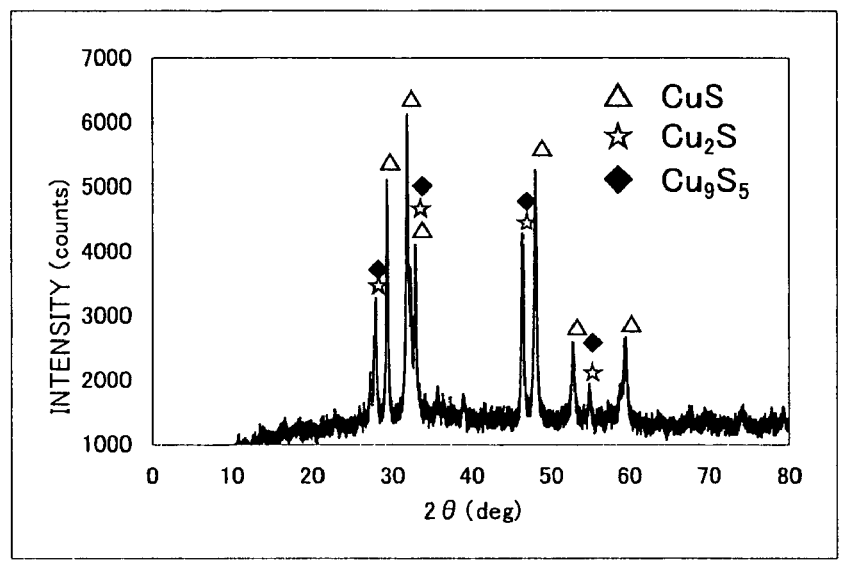
FIG. 4 shows the X-ray diffraction results of copper sulfide in Example 4.
Figure 5:
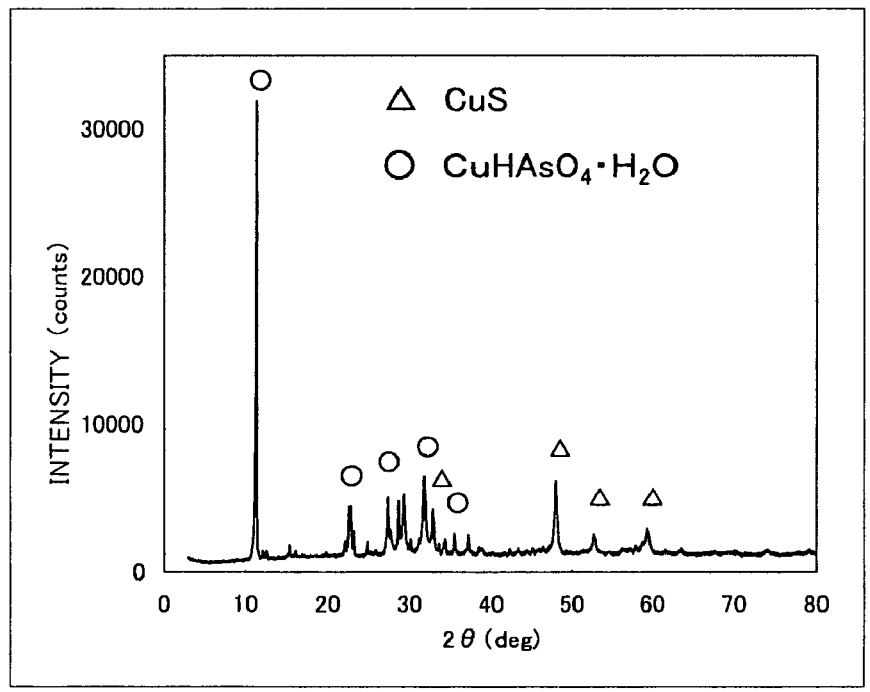
FIG. 5 shows the X-ray diffraction results of the residue in Example 4.
Figure 6:
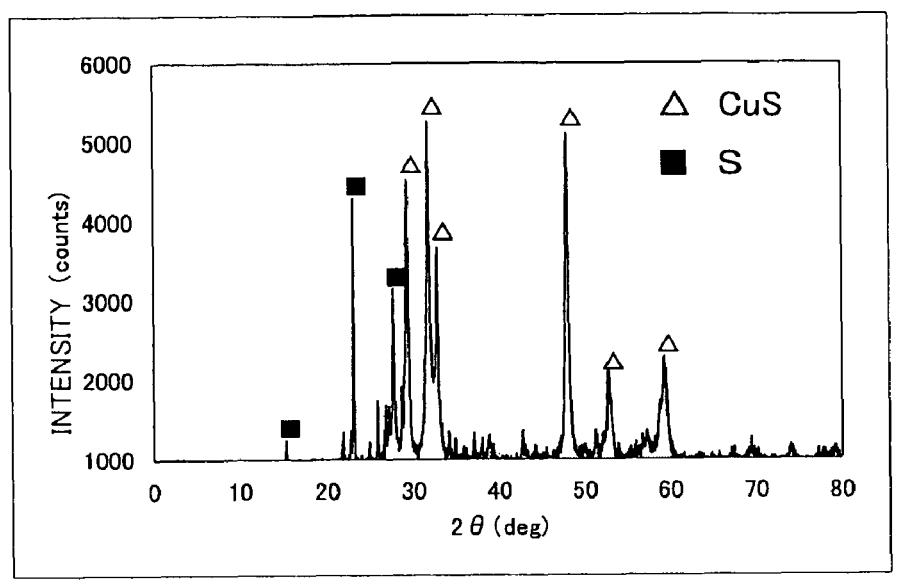
FIG. 6 shows the X-ray diffraction results of the residue in Comparative Example 5.
Figure 7:
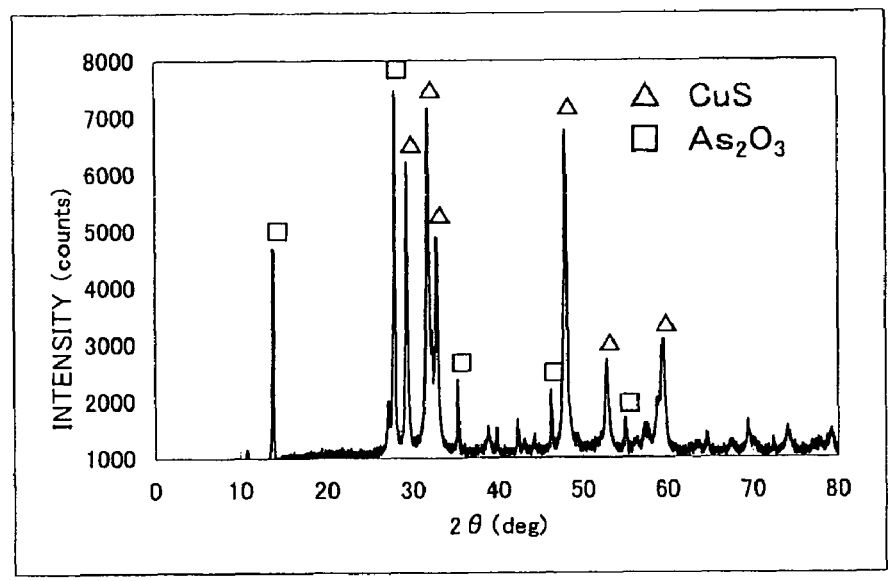
FIG. 7 shows the X-ray diffraction results of the residue in Comparative Example 6.

The invention claimed is:

1. An arsenic processing method, comprising:
a first step of leaching arsenic from a non-ferrous smelting intermediate containing arsenic, while maintaining a pH in a range of 4.0 to 6.5, forming a slurry from the non-ferrous smelting intermediate, and performing leaching while maintaining the pH in the range of 4.0 to 6.5 by adding sodium hydroxide at a temperature of 50° C. or higher, while blowing air, oxygen, or a gas mixture of air and oxygen,
a second step of leaching arsenic while allowing the pH to change, without maintaining the pH, stopping the maintenance of the pH at a point when the arsenic contained in the non-ferrous smelting intermediate is leached in a range of 50% to 90%, continuing leaching while keeping the blowing of air, oxygen, or a gas mixture of air and oxygen, and completing a reaction at a point when the pH decreases to 4 or less;
a third step of oxidizing trivalent arsenic in a leaching solution obtained in the second step to pentavalent arsenic, by adding an oxidation agent to the leaching solution; and
a fourth step of converting the pentavalent arsenic in an adjusted solution obtained in the third step to scorodite crystals.

2. The arsenic processing method according to claim 1, wherein the arsenic contained in the non-ferrous smelting intermediate is in a sulfide or in a mixture of a sulfide.

3. The arsenic processing method according to claim 1, wherein the second step comprises stopping the maintenance of the pH at a point when the arsenic contained in the non-ferrous smelting intermediate is leached in a range of 50% to 90%, continuing leaching while keeping the blowing of air, oxygen, or a gas mixture of air and oxygen, stopping the blowing at a point when the pH decreases to below 4 or less, and further performing mixing for 10 minutes or longer before completion.

4. The arsenic processing method according to claim 1, wherein said third step comprises a liquid adjusting step of adding hydrogen peroxide to the leaching solution at a temperature of 40° C. or higher to oxidize the trivalent arsenic to the pentavalent arsenic, and then bringing the reacted solution into contact with metallic copper to remove residual hydrogen peroxide.

5. The arsenic processing method according to claim 1, wherein said fourth step comprises a crystallizing step of adding and dissolving ferrous ($Fe^{2+}$) salt into the adjusted solution, and causing an oxidation reaction.

6. The arsenic processing method according to claim 5, wherein the oxidation reaction is performed in a pH range of 1 or lower.

7. The arsenic processing method according to claim 5, wherein the oxidation reaction is performed at a temperature of 50° C. or higher.

8. The arsenic processing method according to claim 5, wherein the oxidation reaction is blowing of air, oxygen, or a gas mixture of air and oxygen.

* * * * *